United States Patent

Mukaihara et al.

Patent Number: 5,854,825
Date of Patent: Dec. 29, 1998

[54] METHOD OF CONTROLLING SILENT MONITORING OF A GROUP

[75] Inventors: Masataka Mukaihara; Takeshi Fumeno; Takaki Nakamatsu; Miwa Kususe, all of Fukuoka, Japan

[73] Assignee: Fujitsu Limited, Kanagawa, Japan

[21] Appl. No.: 726,752

[22] Filed: Oct. 7, 1996

[30] Foreign Application Priority Data

Apr. 26, 1996 [JP] Japan .................................. 8-107249

[51] Int. Cl.⁶ .............................. H04M 1/24; H04M 3/00; H04M 5/00
[52] U.S. Cl. ............................ 379/34; 379/265; 379/266; 379/309
[58] Field of Search .................................. 379/34, 35, 38, 379/111, 112, 113, 133, 265, 266, 309

[56] References Cited

U.S. PATENT DOCUMENTS

| | | | |
|---|---|---|---|
| 5,062,103 | 10/1991 | Davidson et al. | 379/265 |
| 5,185,780 | 2/1993 | Leggett | 379/34 |
| 5,239,460 | 8/1993 | Larouche | 364/401 |
| 5,329,523 | 7/1994 | Saito et al. | 379/211 |
| 5,414,752 | 5/1995 | Jonsson | 379/265 |
| 5,465,286 | 11/1995 | Clare et al. | 379/265 |
| 5,499,291 | 3/1996 | Kepley | 379/265 |
| 5,533,103 | 7/1996 | Peavey et al. | 379/265 |
| 5,535,256 | 7/1996 | Maloney et al. | 379/265 |
| 5,577,112 | 11/1996 | Cambray et al. | 379/216 |
| 5,592,542 | 1/1997 | Honda et al. | 379/265 |
| 5,621,789 | 4/1997 | McCalmont et al. | 379/265 |
| 5,696,811 | 12/1997 | Maloney et al. | 379/265 |
| 5,757,889 | 5/1998 | Ohtake | 379/265 |
| 5,764,728 | 6/1998 | Ala et al. | 379/265 |
| 5,784,452 | 7/1998 | Carney | 379/265 |

FOREIGN PATENT DOCUMENTS 591552  4/1993  Japan .

Primary Examiner—Curtis A. Kuntz
Assistant Examiner—Rexford N. Barnie
Attorney, Agent, or Firm—Helfgott & Karas, P C.

[57] ABSTRACT

A method of controlling silent monitoring of a group in an electronic exchange accommodating a terminal of a monitoring individual and terminals of individuals to be monitored, wherein a call between a prescribed individual to be monitored and a customer is allowed to be monitored by the monitoring individual. The individuals to be monitored are divided into groups, groups to be monitored are allocated to the monitoring individual and this information is entered into a call controller of the electronic exchange. The call controller observes, group by group, call-in-progress/call-not-in-progress status of the individuals to be monitored and allows the monitoring individual to automatically monitor, in succession, calls between customers and call-in-progress individuals to be monitored belonging to the monitoring target groups allocated to the monitoring individual.

17 Claims, 39 Drawing Sheets

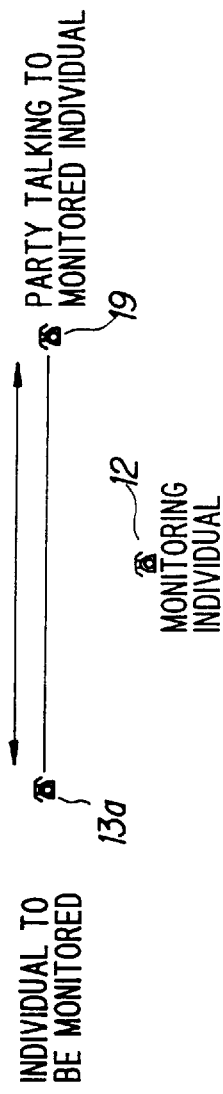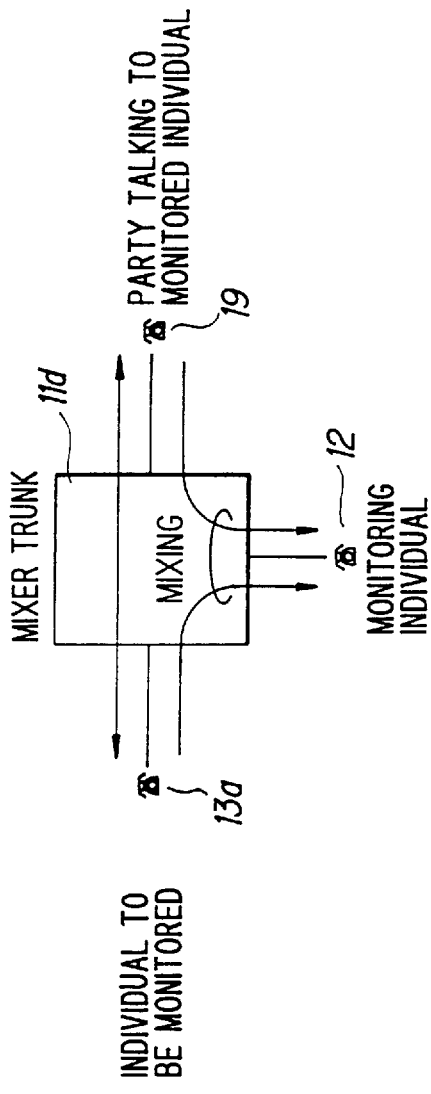

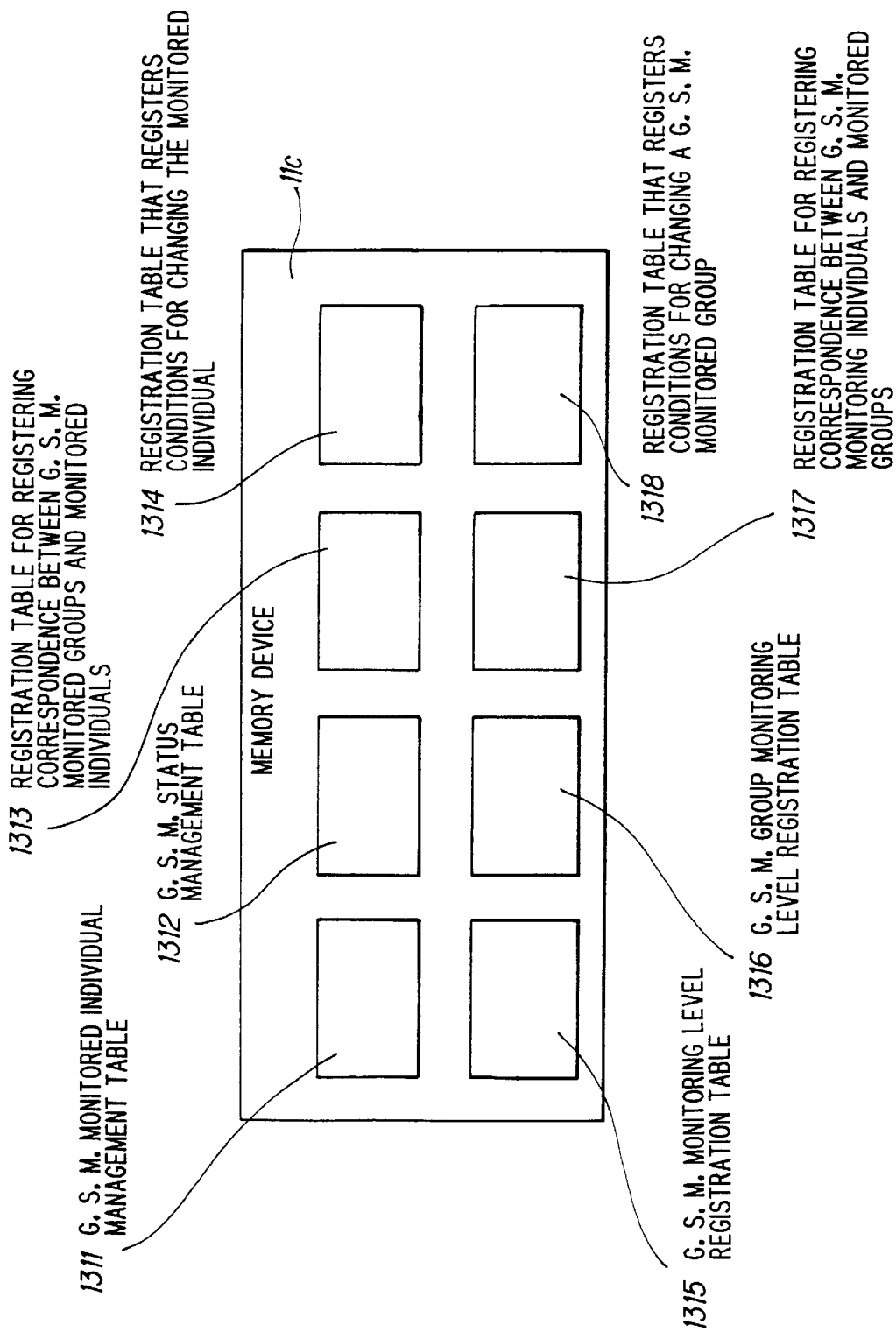

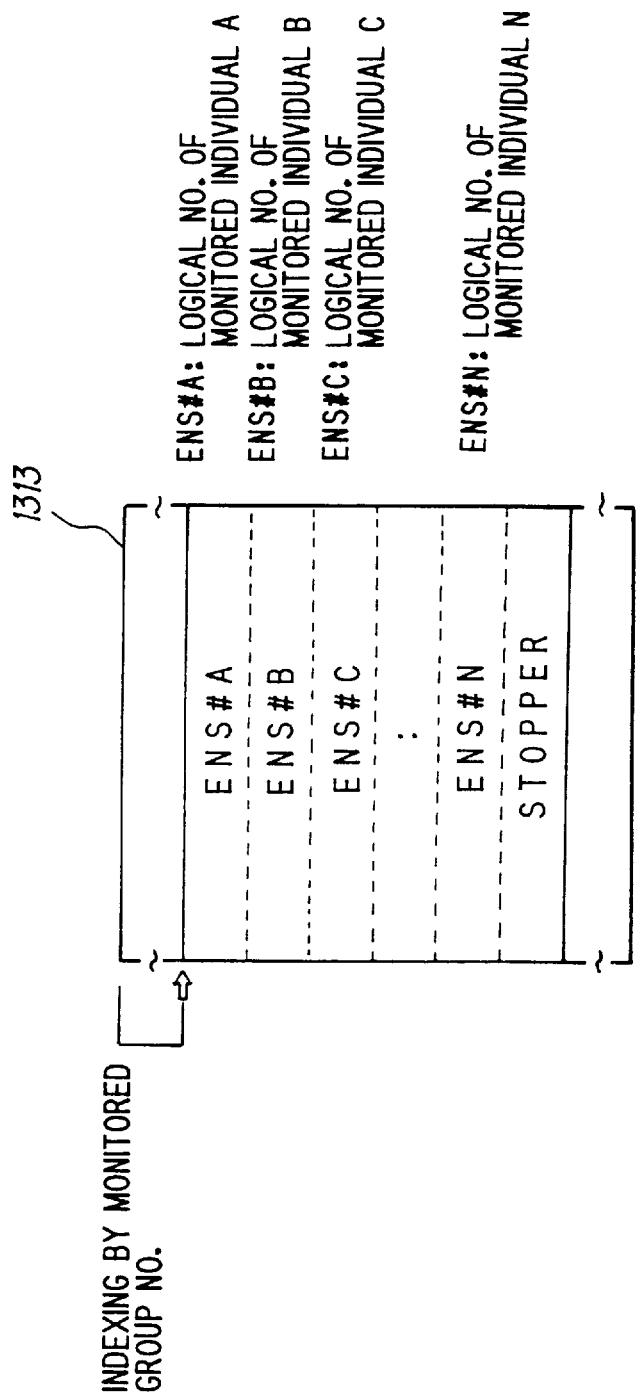

FIG. 9A

INDEXING BY LOGICAL NO. OF MONITORING INDIVIDUAL 12

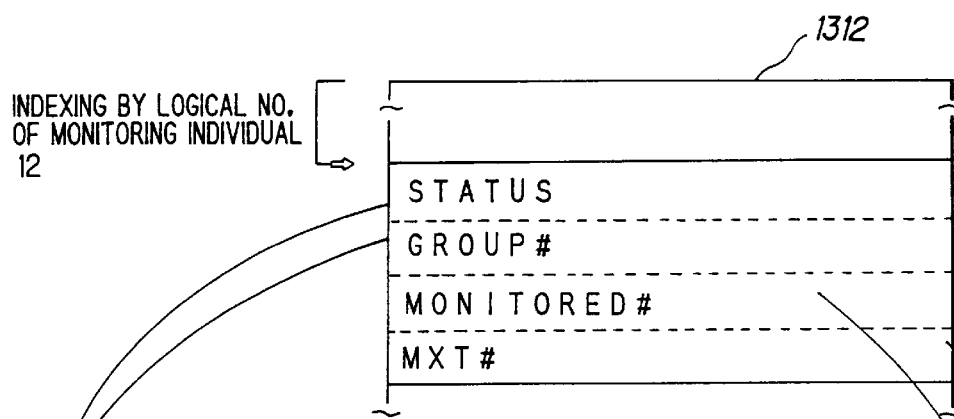

1312

STATUS
GROUP#
MONITORED#
MXT#

FIG. 9B

STATUS : MONITORING STATUS OF MONITORING INDIVIDUAL
"LOGICAL VALUE (0) = NO MONITORING" OR
"LOGICAL VALUE (1) = MONITORING BEING REQUESTED" OR
"LOGICAL VALUE (2) = MONITORING IN PROGRESS" OR
"LOGICAL VALUE (3) = MONITORING STANDBY"

GROUP# : LOGICAL NO. OF MONITORED GROUP THAT IS TARGET OF MONITORING BY MONITORING INDIVIDUAL 12

MONITORED # : LOGICAL NO. OF MONITORED INDIVIDUAL THAT IS TARGET OF MONITORING BY MONITORING INDIVIDUAL

MXT# : LOGICAL NO. OF MIXER TRUNK USED IN MONITORING BY MONITORING INDIVIDUAL 12

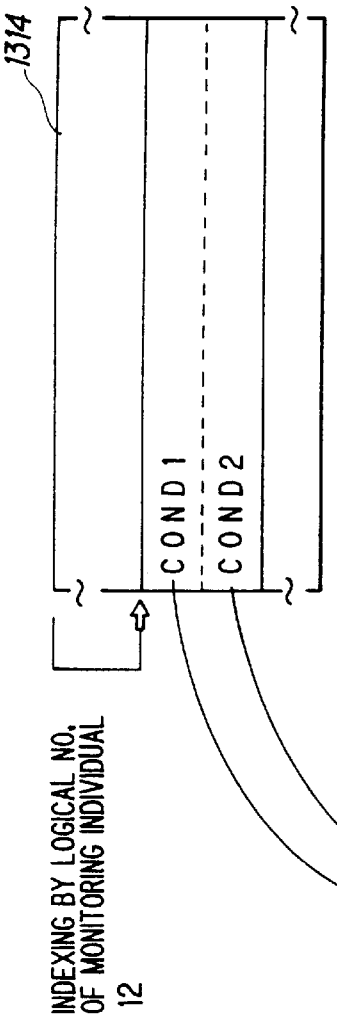

COND1: TIMING FOR CHANGING INDIVIDUAL TO BE MONITORED
"LOGICAL VALUE (0) = WHEN INDIVIDUAL CURRENTLY BEING MONITORED (MONITORED INDIVIDUAL) FINISHES TALKING"
"LOGICAL VALUE (1) = WHEN TALKING MONITORED INDIVIDUAL APPEARS ANEW IN GROUP CURRENTLY BEING MONITORED"
~
"LOGICAL VALUE (255) = WHEN 1 MIN. HAS ELAPSED FROM START OF MONITORING"

COND2: INDIVIDUAL TO BE MONITORED NEXT
"LOGICAL VALUE (0) = MONITORED INDIVIDUAL TALKING LONGEST AMONG CURRENTLY MONITORED INDIVIDUALS REGISTERED IN MONITORED GROUP"
"LOGICAL VALUE (1) = MONITORED INDIVIDUAL WHO BEGAN TALKING LAST AMONG CURRENTLY MONITORED INDIVIDUALS REGISTERED IN MONITORED GROUP"
~
"LOGICAL VALUE (255) = ORDER IN WHICH MONITORED INDIVIDUALS HAVE BEEN REGISTERED IN REGISTRATION TABLE REGISTERING CORRESPONDENCE BETWEEN G.S.M. MONITORED GROUPS AND MONITORED INDIVIDUALS"

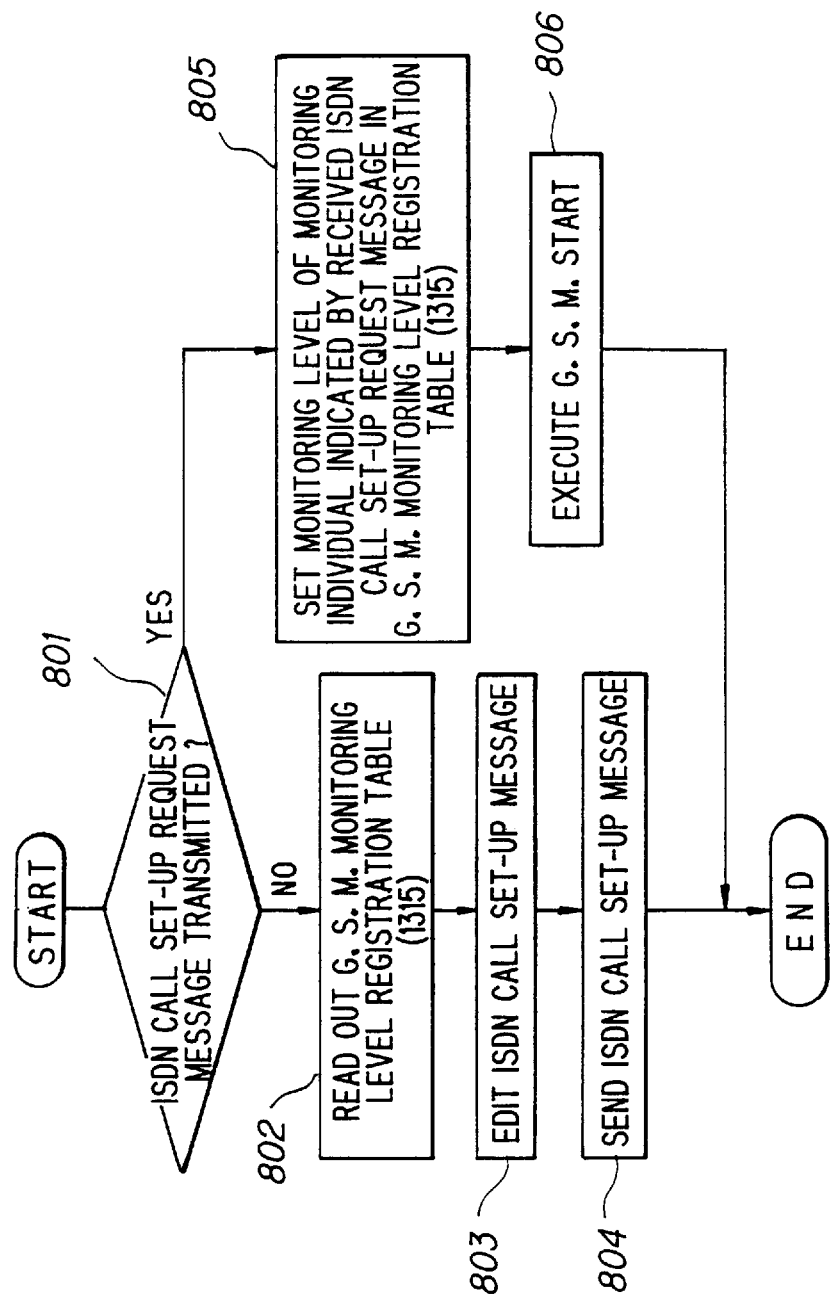

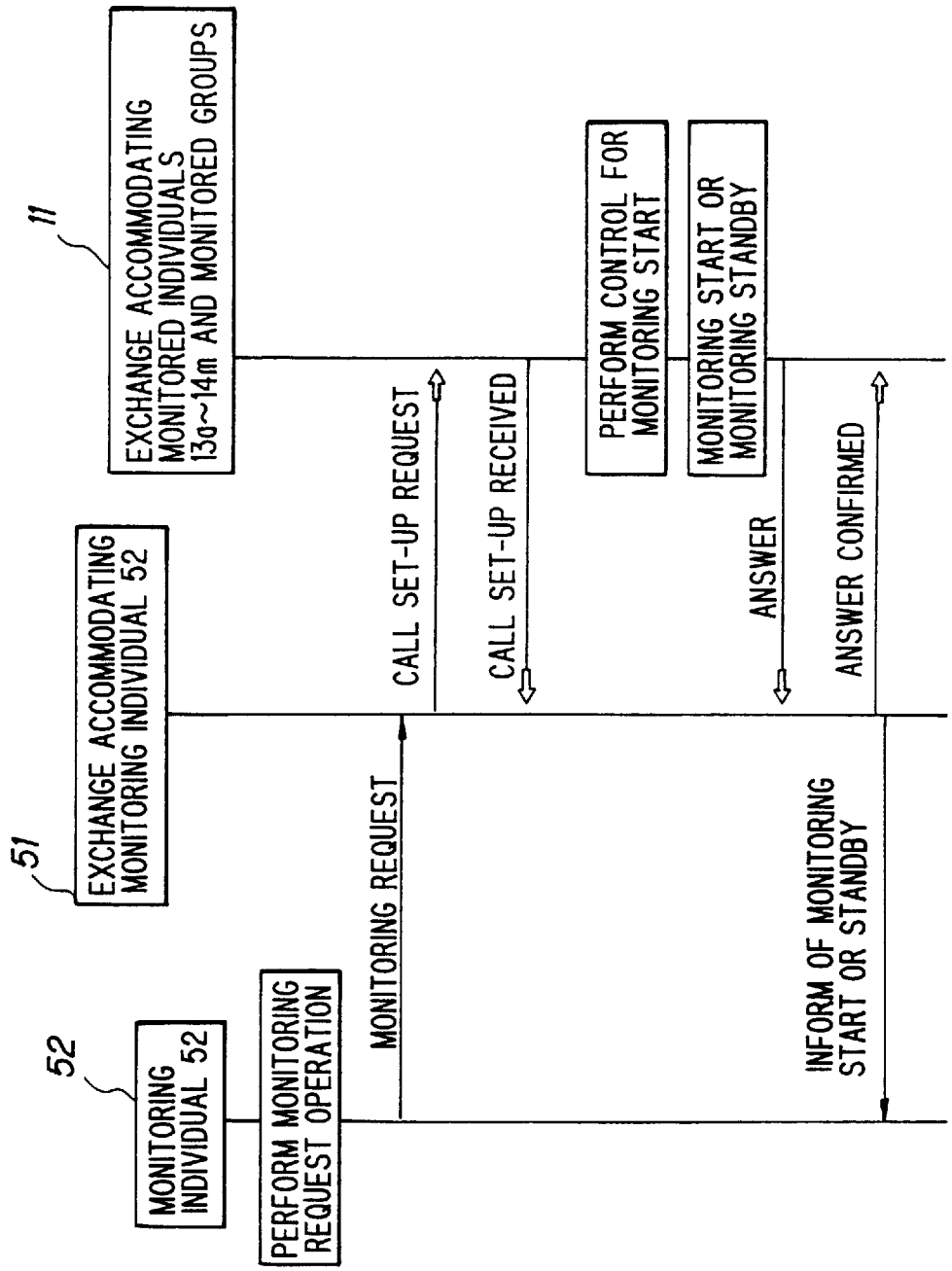

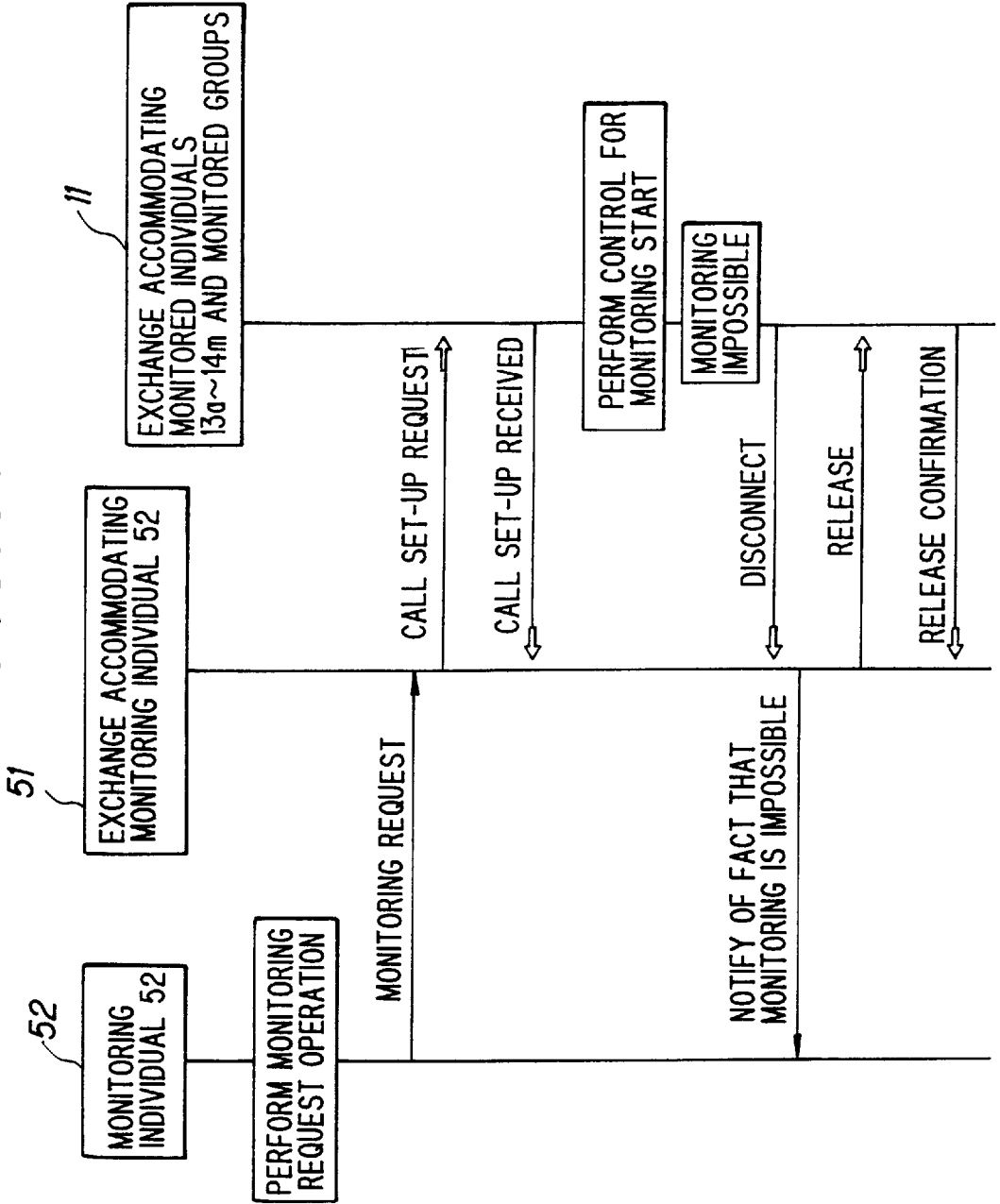

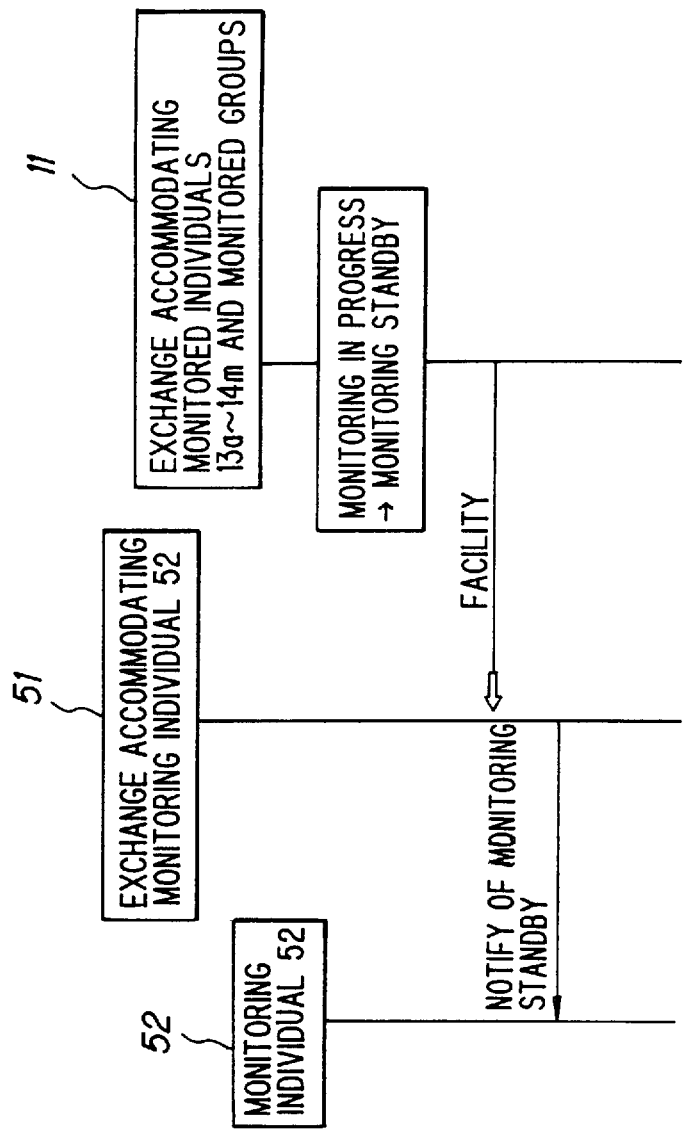

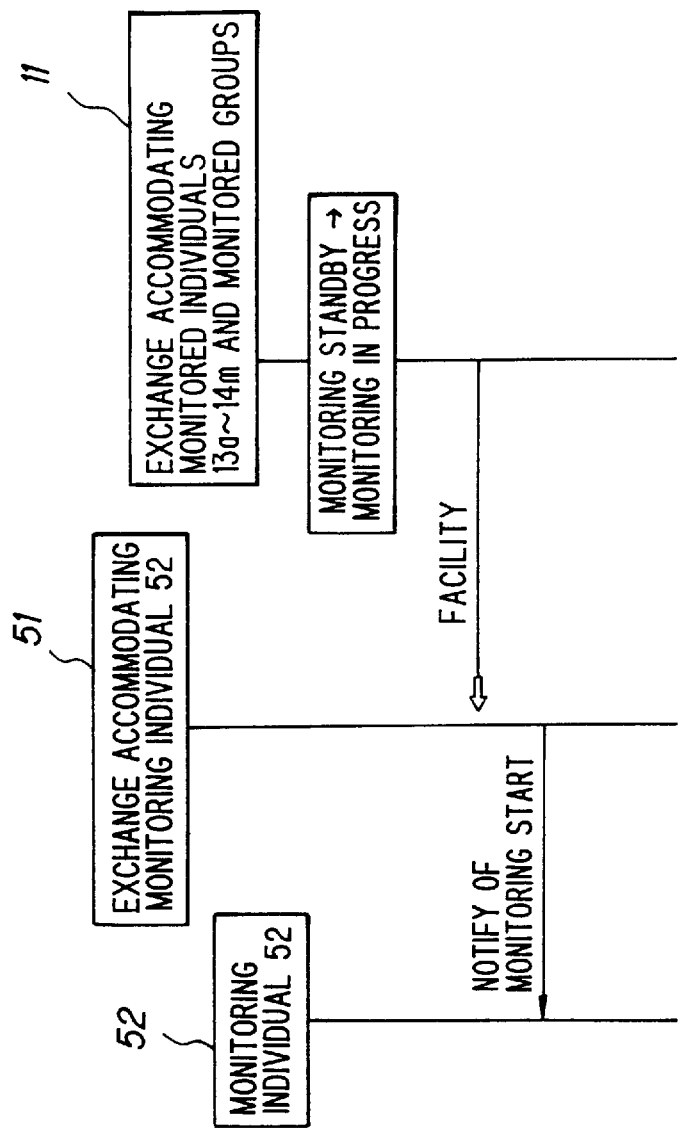

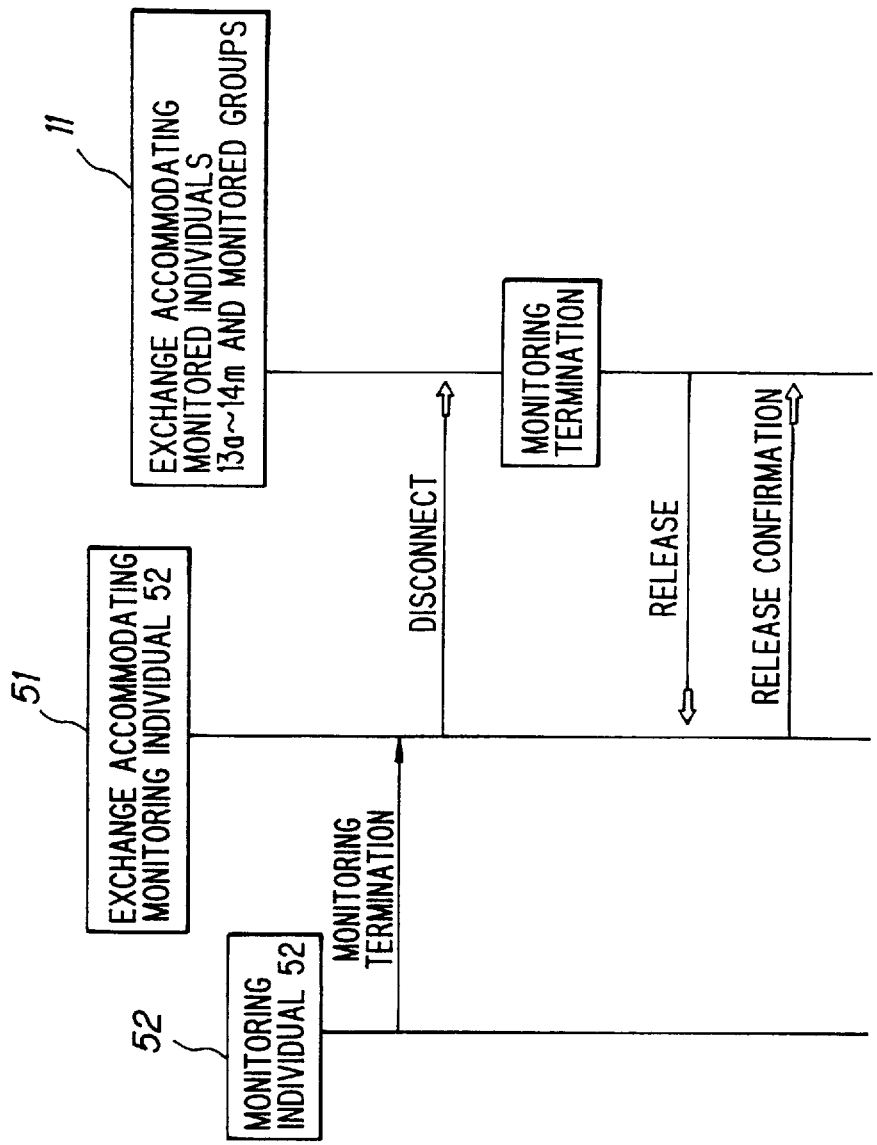

METHOD OF CONTROLLING SILENT MONITORING OF A GROUP

BACKGROUND OF THE INVENTION

This invention relates to a method of controlling the silent monitoring of a group. More particularly, the invention relates to a silent group monitoring control method in an electronic exchange in which a specific terminal (a monitoring individual) monitors the calls on another specific terminal (a monitored individual).

In silent monitoring which is known as one type of telephone service of an electronic exchange, a monitoring individual monitors a call between a customer and a monitored individual specified by the monitoring individual.

In businesses such as telemarketing where it is necessary for a supervisor (the monitoring individual) to monitor the calls of a plurality of operators (telephone answering individuals, i.e., monitored individuals), there is growing demand for the ability to monitor a plurality of monitored individuals automatically.

Further, in businesses such as telemarketing in which a large quantity of calls from customers must be accepted, groups are formed from a plurality of attendant boards and a virtual telephone number is allocated to each group. Calls placed from customers to the virtual telephone number are distributed to the attendant boards within the group so that a large quantity of calls can be dealt with efficiently.

FIG. 40 is a diagram for describing a telephone operation in such a conventional telemarketing business. Shown in FIG. 40 are a public network 1, a PBX (private branch exchange) 2 constituted by an electronic exchange, a first group of attendant boards (telephones) 3a~3d, a second group of attendant boards (telephones) 4a~4d, a supervisor telephone 5, and trunk circuits 6a~6n which connect the PBX and the public network. A virtual telephone number X has been allocated to the first group and a virtual telephone number Y to the second group.

When a customer 1 dials the virtual telephone number X of the first group, the telephone of this customer is connected to the PBX 2 via the public network 1. The PBX 2 then connects this customer to the attendant board 3a, which is not currently busy, and an operator answers the customer 1 from this attendant board 3a. When customers 2, 3, . . . successively dial the virtual telephone number X under these conditions, the PBX 2 successively connects each of the customers to the attendant boards 3b, 3c, . . . that are not busy. Though the foregoing is for a case where customers dial the virtual telephone number of the first group, the same description holds for a case where customers dial the virtual telephone number of the second group.

When the operator in charge of, say, attendant board 3a that has received a call from a certain customer can no longer manage to answer the call himself in an operation of this kind, this individual notifies the supervisor of the need for assistance. Upon being so notified, the supervisor picks up the telephone 5, enters a special number and the number of telephone 3a, establishes a silent monitoring state and monitors the call answered by the operator in charge of the attendant board. In other words, the supervisor becomes the monitoring individual in silent monitoring and the operator in charge of the attendant board 3a becomes the monitored individual. Thereafter, the supervisor interrupts the call when necessary and answers the customer together with the operator that accepted the call.

Further, in a case where the supervisor observes the attitude of the operator in charge of an attendant board, e.g., whether the operator's language with respect to the customer is discourteous or whether the content of the operator's conversation is correct or not, the supervisor uses silent monitoring to monitor the call currently being answered by the operator of the attendant board.

With this method of controlling silent monitoring in a system having this conventional PBX, a single individual specified for monitoring by a monitoring request from a monitoring individual is monitored. Accordingly, if a specified individual to be monitored is talking (busy) on the telephone when a monitoring individual issues a monitoring request, the silent monitoring state is established at this time and monitoring can be carried out. However, if the specified individual to be monitored is not currently talking on the telephone, monitoring cannot start and monitoring is suspended or the system waits until the individual to be monitored is talking.

Further, in a case where the monitoring individual attempts to monitor an individual other than an individual currently being monitored, the monitoring individual terminates the currently prevailing silent monitoring (hangs up the telephone) and then repeats the monitoring request operation with regard to the other individual (i.e., takes the telephone off the hook, enters the special number and then enters the number of the individual to be monitored).

Thus, with the conventional exchange (PBX), only one individual can be designated for monitoring by the monitoring request operation performed by the monitoring individual. Consequently, when requests for assistance are sent to the supervisor (monitoring individual) from a plurality of attendant boards (individuals to be monitored) simultaneously, the supervisor performs the monitoring request operation with respect to the first attendant board, establishes the silent monitoring state and assists this attendant board. If it subsequently becomes necessary to assist another attendant board, the supervisor performs the monitoring request operation again, establishes the silent monitoring state and assists this attendant board. Thus, it is necessary for the supervisor to perform the monitoring request operation whenever the attendant board to be monitored is changed. This requires that the supervisor performs a troublesome operation which takes time until monitoring is established. The result is a decline in quality of service to the customer.

Further, in a case where the business attitude of the operator in charge of an attendant board is to be observed, it is required that the supervisor performs the monitoring request operation whenever the attendant board to be monitored is changed. Consequently, operability is poor and rapid monitoring cannot be carried out.

Furthermore, there is a good possibility that a designated attendant board will not be busy (talking) and that the supervisor will not be able to start the monitoring desired, in which case there is a decline in the working efficiency of the supervisor. In other words, if talking is not taking place at the designated attendant board, the supervisor waits for talking to begin at the board or abandons the monitoring of this board and performs a monitoring request operation for the purpose of monitoring the next attendant board. In this case it is required that the monitoring request operation is performed until a busy attendant board is found. The result is a decline in the working efficiency of the supervisor.

SUMMARY OF THE INVENTION

Accordingly, an object of the present invention is to provide a silent group monitoring control method through which a plurality of individuals to be monitored can be monitored in succession automatically in response to a single monitoring request operation performed by a monitoring individual.

Another object of the present invention is to provide a silent group monitoring control method in which an individual to be monitored can be changed automatically without requiring that a monitoring individual performs a request operation.

Still another object of the present invention is to provide a silent group monitoring control method which makes it possible for a supervisor to work more efficiently.

A further object of the present invention is to provide a silent group monitoring control method through which the time needed for monitoring to start and the time needed to change an individual to be monitored can be shortened, thereby making it possible to improve the quality with which telephones are answered in telemarketing or to provide better service in silent monitoring.

In accordance with the present invention, the foregoing objects are attained by providing a method of controlling silent monitoring of a group in an electronic exchange accommodating a terminal of a monitoring individual and terminals of individuals to be monitored and having a silent monitoring function which allows the monitoring individual to monitor a call between a prescribed individual to be monitored and a customer, the method comprising the steps of forming the individuals to be monitored into groups, allocating monitoring target groups to the monitoring individual, observing, group by group, call-in-progress/call-not-in-progress status of individuals to be monitored, and allowing the monitoring individual to automatically monitor, in succession, calls between customers and call-in-progress individuals to be monitored belonging to the monitoring target groups allocated to the monitoring individual.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4A is an explanatory view illustrating a channel in a case where monitoring is not being performed, and FIG. 4B is an explanatory view illustrating a channel in a case where monitoring is being performed;

FIG. 5 is a diagram illustrating various tables stored in a storage device;

FIG. 6 is a registration table for registering monitored individuals constituting a G.S.M. monitored group;

FIGS. 9A, 9B are diagrams for describing a G.S.M. status management table;

FIGS. 10A, 10B are diagrams for describing a registration table of conditions for changing G.S.M. monitored individuals;

FIG. 31 is a flowchart of G.S.M. ISDN call set-up request control;

FIG. 33 is a sequence (monitoring start and standby) of ISDN layer-3 messages in a case where. silent group monitoring is performed via an ISDN trunk line;

FIG. 34 is a sequence (monitoring impossible) of ISDN layer-3 messages in a case where silent group monitoring is performed via an ISDN trunk line;

FIG. 37 is a sequence (monitoring standby) of ISDN layer-3 messages in a case where silent group monitoring is performed via an ISDN trunk line;

FIG. 38 is a sequence (standby→start of monitoring) of ISDN layer-3 messages in a case where silent group monitoring is performed via an ISDN trunk line;

FIG. 39 is a sequence (monitoring termination) of ISDN layer-3 messages in a case where silent group monitoring is performed via an ISDN trunk line.

DESCRIPTION OF THE PREFERRED EMBODIMENTS (A) Overview of the Invention

Figure 1:
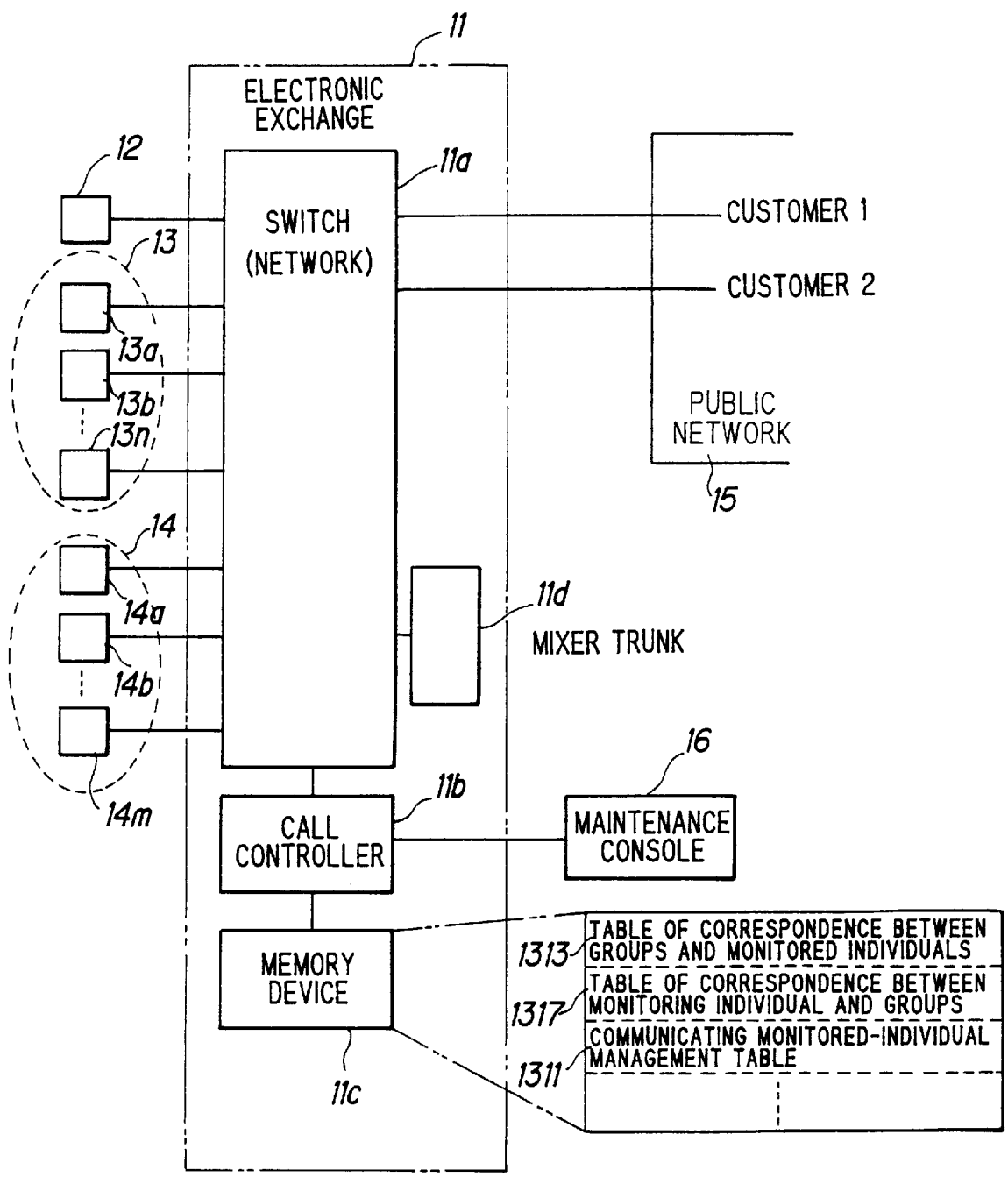
FIG. 1 is a diagram for describing an overview of the present invention.

FIG. 1 is a diagram for describing an overview of the present invention.

Numeral 11 denotes an electronic exchange having a switch (network circuit) 11a, a call controller 11b for executing silent group monitoring, a memory device 11c for storing various tables, and a mixer trunk 11d. Connected to the switch 11a are a terminal (telephone) 12 of a monitoring individual, and terminals (telephones) 13a~13n, 14a~14m, . . . of monitored individuals. A first group 13 is formed by the terminals 13a~13n of the monitored individuals and a second group 14 is formed by the terminals 14a~14m of the monitored individuals. Numeral 15 denotes a public network and 16 a maintenance console.

In accordance with a command from the maintenance console 16, the call controller 11b forms the monitored individuals (the terminals of the monitored individuals) into groups and registers a correspondence table 1313, which indicates the correspondence between the a group and its monitored individuals, in the memory device 11c. Further, in accordance with a command from the maintenance console 16, the call controller 11b registers a correspondence table 1317, which indicates the correspondence between the monitoring individual and groups which this monitoring individual monitors, in the memory device 11c.

The call controller 11b oversees call-in-progress/call-not-in-progress status of all individuals to be monitored (i.e., keeps track of whether all monitored individuals are or are not talking), creates a monitored individual management table 1311 for managing talking individuals to be monitored and registers this table in the memory device 11c. When a monitoring start request is issued by the monitoring individual 12 under these conditions, the call controller 11b refers to the monitored individual management table 1311 to find a talking individual to be monitored, which is a monitored individual who belongs to a monitoring target group of the monitoring individual, introduces the call audio between this monitored individual and a customer to the mixer trunk lid via the switch 11a, whereby mixing is carried out, enters the mixed audio into the monitoring terminal 12 and allows the monitoring individual to monitor the call between the monitored individual and the customer. The call controller 11b thenceforth allows the monitoring individual to successively monitor the calls between customers and other talking monitored individuals belonging to the monitored group.

Further, the call controller 11b oversees the status of monitoring, such as start/end of monitoring, change of monitored individual and change of monitoring target group, notifies the monitoring individual of the status of monitoring and notifies the individual who is undergoing monitoring of this fact.

Further, in a case where a talking individual to be monitored does not exist in the monitoring target group when monitoring starts or when the individual to be monitored is changed, the call controller 11b asks the monitoring individual whether monitoring is to be ended or whether the monitoring individual will wait until monitoring becomes possible, and executes monitoring termination processing or monitoring standby processing, depending upon the command entered by the monitoring individual.

Two methods are available to change the individual to be monitored. According to the first method, conditions for changing the individual to be monitored are entered from the maintenance console 16 and stored in the memory device 11c, and the call controller 11b automatically changes the individual to be monitored in accordance with the stored conditions. According to the second method, the call controller 11b, following the start of monitoring, observes whether the monitoring terminal 12 has issued a request to change the individual to be monitored. If this request has been issued, the call controller 11b allows the monitoring individual to monitor the call between a customer and the next talking individual to be monitored that belongs to the monitoring target group.

The monitoring individual need not monitor individuals who are skilled. Accordingly, the maintenance console 16 sets monitoring levels for the individuals to be monitored and for the monitoring individual and stores these levels in the memory device 11c. If the monitoring level of the monitoring individual is lower than the monitoring level of an individual to be monitored, the call controller 11b arranges it so that this individual is not monitored. Further, the maintenance console 16 gives a predetermined monitored individual, such as a skilled individual, the right to refuse monitoring and stores this right in the memory device 11c. If an individual currently undergoing monitoring requests that monitoring be refused, the call controller 11b determines whether this individual has been given the right to refuse monitoring. If it is determined that the right has been given to this individual, then the call controller 11b halts the monitoring of this individual and changes the individual to be monitored. If the right to refuse monitoring has not been given, then the call controller 11b allows the monitoring of this individual to continue.

The monitoring individual need not monitor a group composed of skilled individuals. Accordingly, the maintenance console 16 sets monitoring levels for each group and for the monitoring individual and stores these levels in the memory device 11c. If the monitoring level of the monitoring individual is lower than the monitoring level of a monitoring target group, the call controller 11b arranges it so that the individuals belonging to this monitoring target group are not monitored. If the monitoring individual has issued a monitoring termination request, then the call controller 11b terminates the monitoring of the monitoring target group.

The maintenance console 16 sets a plurality of monitoring target groups for monitoring by a monitoring individual and stores these in the memory device 11c. If, when a monitoring request is issued by the monitoring individual, a monitoring target group has not been specified, the call controller 11b starts the monitoring of a talking individual belonging to a first-ranked monitoring target group (namely the group that was registered first) among the set monitoring target group. If a monitoring target group has been specified, the call controller 11b starts the monitoring of a talking individual belonging to the specified monitoring target group.

Two methods are available to change the monitoring target group. According to the first method, conditions for changing the monitoring target group are entered from the maintenance console 16 and set in the memory device 11c, and the call controller 11b automatically changes the monitoring target group in accordance with the set conditions. According to the second method, the call controller 11b observes whether the monitoring individual has issued a request to change the monitoring target group. If this request has been issued, the call controller 11b allows the monitoring individual to monitor the call between a customer and a talking individual to be monitored that belongs to the next monitoring target group.

In a case where a monitored individual has asked a monitoring individual for assistance, it is required that this monitored individual is assisted by a prescribed monitoring individual. Accordingly, the call controller 11b observes whether a monitored individual has issued a monitoring request. If such a request has been issued, then the call controller 11b obtains a monitoring individual for whom the group to which this monitored individual belongs is made a monitoring target group and allows this monitoring individual to start monitoring the monitored individual.

The foregoing is for a situation where one exchange accommodates the terminal of a monitoring individual and the terminals of individuals to be monitored. However, an arrangement may be adopted in which a first ISDN exchange accommodates the terminals of individuals to be monitored, a second ISDN exchange accommodates a terminal of monitoring individual, the first and second ISDN exchanges are connected by an ISDN trunk line and call set-up messages, answer messages, etc. are exchanged by the first and second exchanges to perform silent monitoring of groups. More specifically, the first ISDN forms the monitored individuals into groups, allocates monitoring target groups to the monitoring individual and oversees call-in-progress/call-not-in-progress status of the monitored individuals group by group. When a monitoring request has been issued by a monitoring individual, the second ISDN exchange sends the first ISDN exchange a call set-up request message, which includes the identification number of the monitoring individual and monitoring start request. Upon receiving the call set-up request message, the first ISDN exchange sends a call mixing signal, which is obtained from a customer and a talking monitored individual belonging to the monitoring target group of the monitoring individual, to the monitoring individual (monitoring terminal) via the ISDN trunk line and second ISDN exchange and allows the monitoring individual to perform silent group monitoring. In this case, the first ISDN exchange oversees the status of monitoring, such as start/end of monitoring, change of monitored individual and change of monitoring target group, and transmits the status of monitoring to the monitoring terminal via the ISDN trunk line and second ISDN exchange.

(B) First Embodiment
(a) System Configuration
(a-1) Overall Configuration

Figure 2:
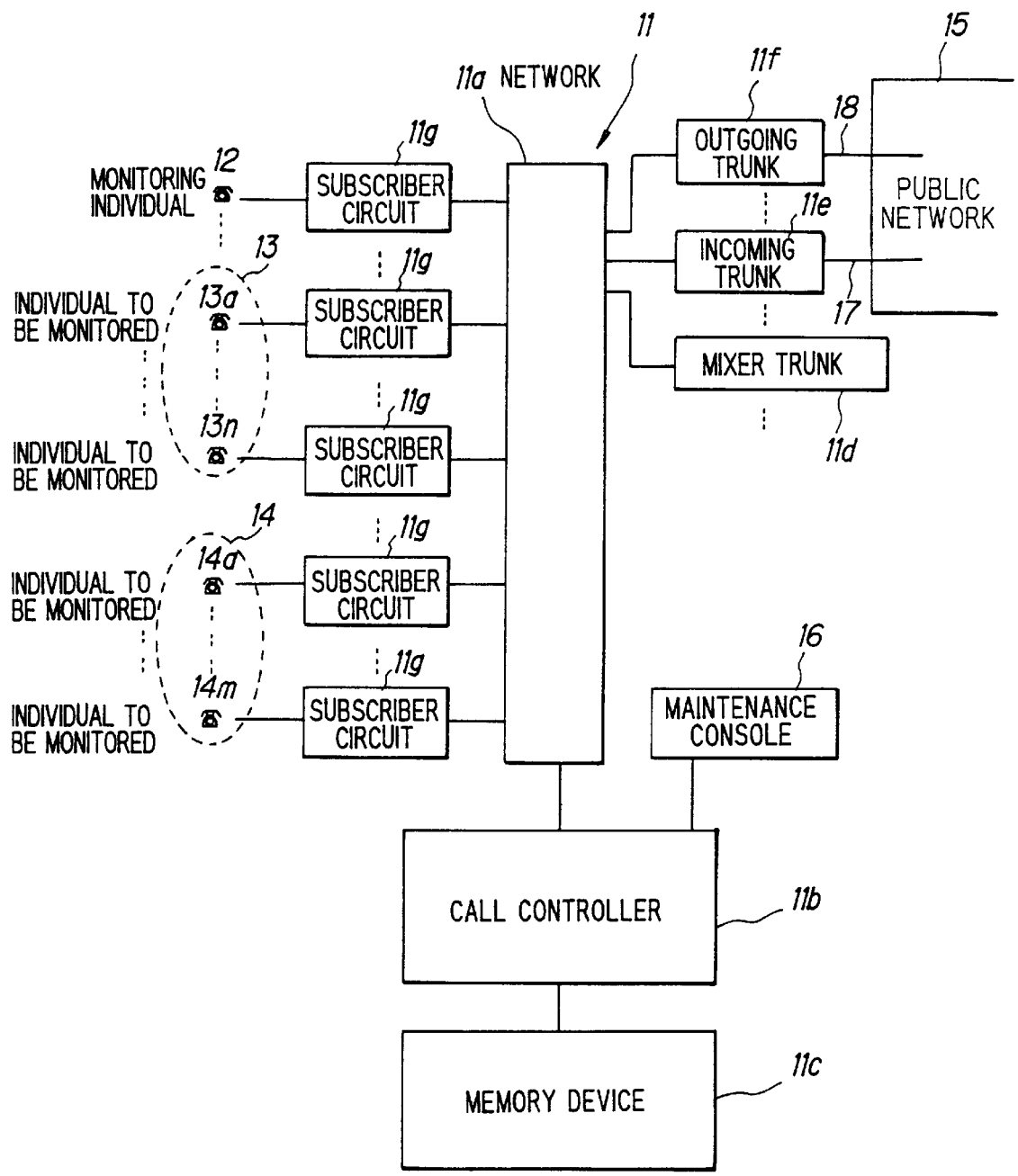
FIG. 2 is a block diagram illustrating the system configuration of the present invention.
Figure 3:
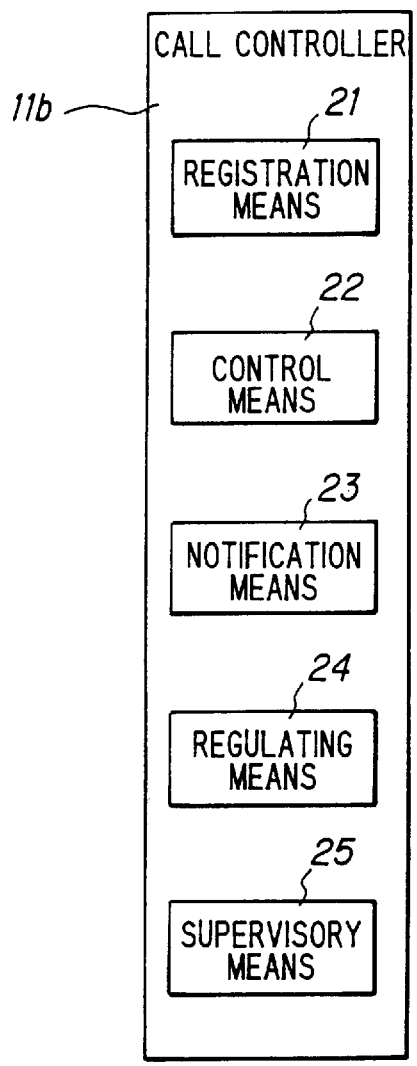
FIG. 3 is a diagram for describing the function of call controller.

FIG. 2 is a diagram illustrating the system architecture the present invention.

Numeral 11 denotes the electronic exchange to which the terminal (telephone) 12 of a monitoring individual engaged in silent monitoring is connected. The terminals (telephones) 13a~13n, 14a~14m, . . . of monitored individuals undergoing silent monitoring. The first group 13 is formed by the terminals 13a~13n of the monitored individuals and the second group 14 is formed by the terminals 14a~14m of the monitored individuals. Numeral 15 denotes the public network and 16 the maintenance console. Hereafter the terminal 12 of the monitoring individual shall be referred to as a monitoring individual and the terminals 13a~13n, 14a~14m, . . . of the monitored individuals shall be referred to as monitored individuals or individuals to be monitored.

The electronic exchange 11 includes the switch (network circuit) 11a, the call controller 11b for executing control of silent group monitoring, the memory device 11c storing various tables, the mixer trunk 11d, which mixes and outputs audio from a monitored individual, a customer and a monitoring individual, an incoming trunk 11e accommodating an incoming communication line 17 from a public network, an outgoing trunk 11f accommodating an outgoing communication line 18 to the public network, and subscriber circuits 11g. Though only one mixer trunk, one incoming trunk and one outgoing trunk are illustrated, in actuality a number of each of these trunks are provided.

(a-2) Function of Call Controller

The call controller 11b is constituted by a computer and executes control of group silent monitoring (referred to as "G.S.M."), described later, by means of software. Functionally speaking, the call controller 11b is equipped with registration means 21, control means 22, notification means 23, regulating means 24 and supervisory means 25. The registration means 21 registers the information shown below. More specifically, the registration means 21 registers the following:

the monitored individuals who belong to each group when monitored individuals are divided into groups (i.e., the corresponding relationship between monitored groups and the monitored individuals);

monitoring target groups allocated to a monitoring individual (i.e., the corresponding relationship between the monitoring individual and monitored groups);

conditions for changing a monitored group, namely a monitoring target group;

conditions for changing a monitored individual, namely a monitoring target individual; and conditions for regulating monitoring by a monitoring individual.

The notification means 23 notifies the monitoring individual 12 and monitored individuals 13a~14m of the status of monitoring. The regulating means 24 performs control for limiting monitoring based upon regulating conditions registered by the registration means 21 and commands (monitoring refusal) from the monitored individuals 13a~14m. In order to notify the control means 22 of a change in the status (call-in-progress/call-not-in progress status) of a monitored individual, the supervisory means 25 oversees the call status of this monitored individual. The control means 22 performs G.S.M. control indicated by (1)~(3) below.

(1) In accordance with a command from the monitoring individual 12 and conditions registered by the registration means 21, the control means 22 controls the start of monitoring with respect to the plurality of monitored individuals 13a~14m.

(2) In accordance with a change in the status of a monitored individual, registered conditions for changing a monitored individual and registered conditions for changing a monitored group, the control means 22 automatically executes control for changing an individual to be monitored, for changing a group to be monitored, namely the monitoring target group, for monitoring standby and for starting monitoring again.

(3) In response to a command from the monitoring individual 12 or a command from a monitored individual, the control means 22 controls changing of an individual to be monitored, changing of a monitoring target group and termination of monitoring.

(a-3) Mixer Trunk

The mixer trunk 11d mixes and outputs audio from a monitored individual, a customer and a monitoring individual. If monitoring is not in effect, no mixing is performed. When monitoring is being carried out, however, the mixer trunk 11d mixes the call audio of the monitored individual and customer (the party talking to the monitored individual), enters the mixed video into the terminal 12 of the monitoring individual and makes monitoring possible. FIG. 4A illustrates a state in which the monitoring individual is not performing monitoring during a call between the monitored individual 13a and a customer (the party talking to this monitored individual) 19. FIG. 4B illustrates a state in which the monitoring individual 12 is performing monitoring. Here the call video of the monitored individual is mixed with the call video of the customer and entered into the monitoring individual 12 by the mixer trunk 11d.

(b) Tables stored in memory device

The memory device 11c stores tables entered from the maintenance console 16 or tables created by the call controller 11b. FIG. 5 is a diagram for describing the various tables stored in the memory device 11c.

(1) A G.S.M. monitored-individual management table 1311 manages, group by group, talking individuals to be monitored.

(2) A G.S.M. status management table 1312 manages the status of each monitoring individual.

(3) A registration table 1313 for registering monitored individuals constituting a monitored group (i.e., a correspondence table indicating the correspondence between G.S.M. monitored groups and monitored individuals) indicates the correspondence between these groups and monitored individuals in a case where monitored individuals have been divided into groups.

(4) A registration table 1314, which registers conditions for changing a G.S.M. monitored individual, stipulates conditions for changing an individual to be monitored.

(5) A G.S.M. monitoring level registration table 1315 indicates the monitoring levels of monitoring individuals and monitored individuals in order to regulate the monitoring of monitored individuals.

(6) A G.S.M. group monitoring level registration table 1316 indicates the monitoring levels of monitored groups in order to regulate the monitoring of monitored groups.

(7) A registration table 1317 for registering groups to be monitored by a monitoring individual (i.e., a correspondence table giving the correspondence between G.S.M. monitoring individuals and monitored groups) indicates the correspondence between monitoring individuals and groups capable of being monitored by these monitoring individuals.

(8) A registration table 1318, which registers conditions for changing a G.S.M. monitored group, stipulates conditions for changing a group to be monitored, namely a monitoring target group.

The G.S.M. monitored-individual management table 1311 and G.S.M. status management table 1312 are created and managed by the call controller 11b. The other tables are entered from the maintenance console 16 and stored in the memory device 11c. These tables are referred to by the call controller 11b as necessary.

(b-1) Correspondence table indicating correspondence between G.S.M. monitored groups and monitored individuals FIG. 6 is a diagram for describing the correspondence table 1313 indicating the correspondence between G.S.M. monitored groups and monitored individuals. A logical number ENS#i (i=A, B, . . . N) of a monitored individual constituting a monitored group is obtained by indexing in the form of the monitored group number.

Figure 7:
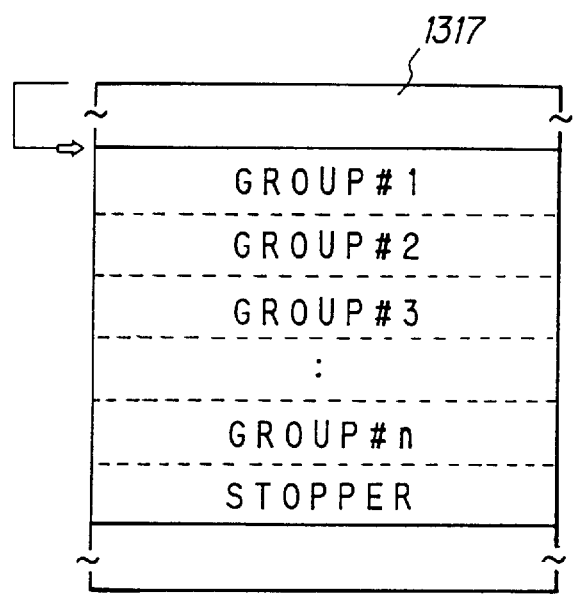
FIG. 7 is a registration table giving the correspondence between G.S.M. monitoring individuals and monitored groups.
Figure 8A:
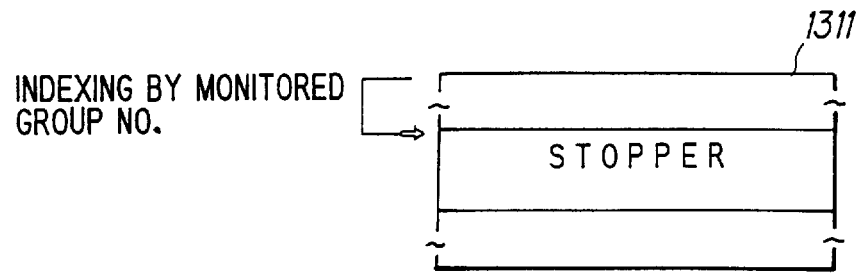
FIGS. 8A, 8B, 8C and 8D are management tables of G.S.M. individuals to be monitored.
Figure 8B:
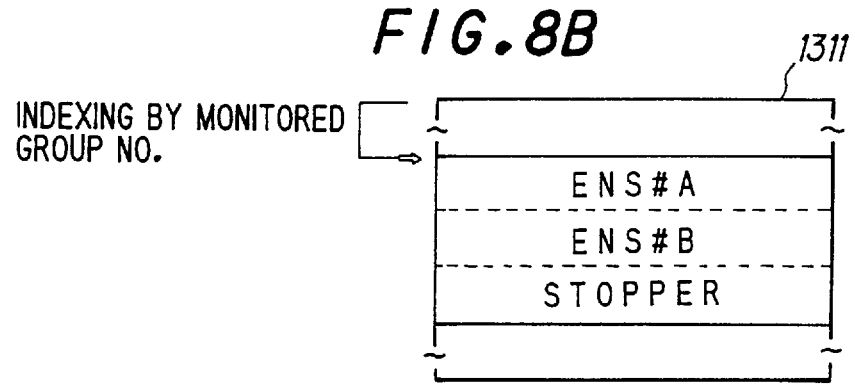
Figure 8C:
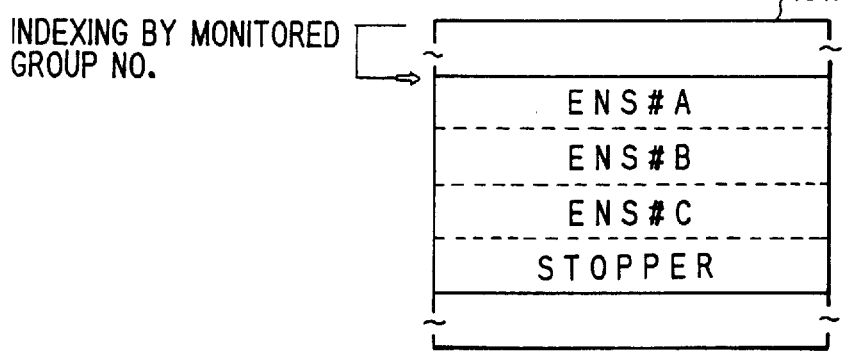
Figure 8D:
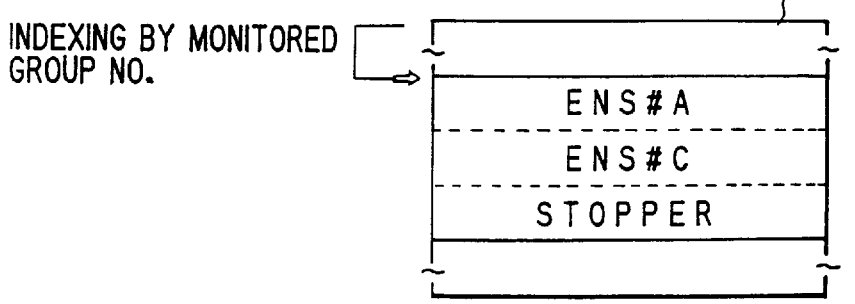

(b-2) Correspondence table giving correspondence between G.S.M. monitoring individuals and monitored groups FIG. 7 is a diagram for describing the correspondence table 1317 giving the correspondence between G.S.M. monitoring individuals and monitored groups. A logical number GROUP#i (i=1, 2, . . . n) of a group to be monitored by a monitoring individual is obtained by indexing in the form of a logical number of the monitoring individual 12.

(b-3) G.S.M. monitored-individual management table

FIG. 8 is a diagram for describing the G.S.M. monitored-individual management table 1311. The logical number of a talking monitored individual in a monitored group is obtained by indexing in the form of the monitored group number of this group. FIG. 8A illustrates a case where a talking monitored individual does not exist; FIG. 8B a case where talking has started in the order of monitored individuals A, B; FIG. 8C a case where monitored individual C has started talking after monitored individuals A and B; and FIG. 8D a case where monitored individual B has finished talking in the situation of FIG. 8C.

(b-4) G.S.M. status management table

FIG. 9A illustrates a G.S.M. status management table for managing the status of each monitoring individual, and FIG. 9B is a table for describing this management table. By indexing in the form of the logical number of the monitoring individual 12 in the G.S.M. status management table 1312, the following are obtained:

(1) the management status. STATUS of each monitoring individual;

(2) the logical number GROUP# of a group to be monitored by the monitoring individual 12;

(3) the logical number MONITORED# of a monitored individual currently being monitored by the monitoring individual 12; and (4) the logical number MXT# of a mixer trunk used in monitoring by the monitoring individual 12.

The monitor status STATUS is given by a logical value between (0) and (3). Specifically, (0) signifies no monitoring, (1) signifies monitoring being requested, (2) signifies monitoring in progress, and (3) signifies monitoring standby.

(b-5) Registration table for registering conditions to change G.S.M. monitored individual FIG. 10A illustrates the registration table 1314 that stipulates conditions for changing an individual to be monitored, and FIG. 10B is a table for describing this. By indexing in the form of the logical number of the monitoring individual in the table 1314, first and second conditions COND1 and COND2 are obtained.

The first condition COND1 stipulates the timing condition for changing the individual to be monitored. The first condition is given by a logical value between (0) and (255). Specifically, [1] the logical value (0) signifies that an individual to be monitored is to be changed to the next individual when a monitored individual currently being monitored has finished talking; [2] the logical value (1) signifies that the change is to be made when a talking monitored individual appears anew in a monitored group currently being monitored; . . . , and [3] the logical value (255) signifies that the change is to be made upon elapse of one minute from the start of monitoring.

The second condition COND2 stipulates the condition for deciding the next individual to be monitored. The second condition is given by a logical value between (0) and (255). Specifically, [1] the logical value (0) signifies that a monitored individual who has been talking the longest among the talking monitored individuals registered in the monitored group is to be decided upon as the next individual to be monitored; [2] the logical value (1) signifies that the monitored individual who began talking last among the talking monitored individuals registered in the monitored group is to be decided upon as the next individual to be monitored; . . . , and [3] the logical value (255) signifies that the next individual to be monitored is decided upon in the order in which monitored individuals have been registered in the correspondence table 1313 indicating the correspondence between G.S.M. monitored groups and monitored individuals.

Figure 11A:
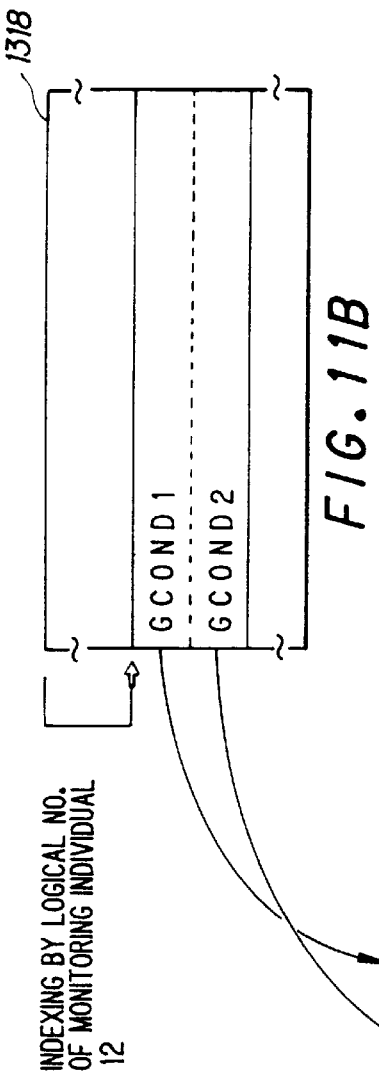
FIGS. 11A, 11B are diagrams for describing a registration table of conditions for changing a G.S.M. monitored group.
Figure 11B:
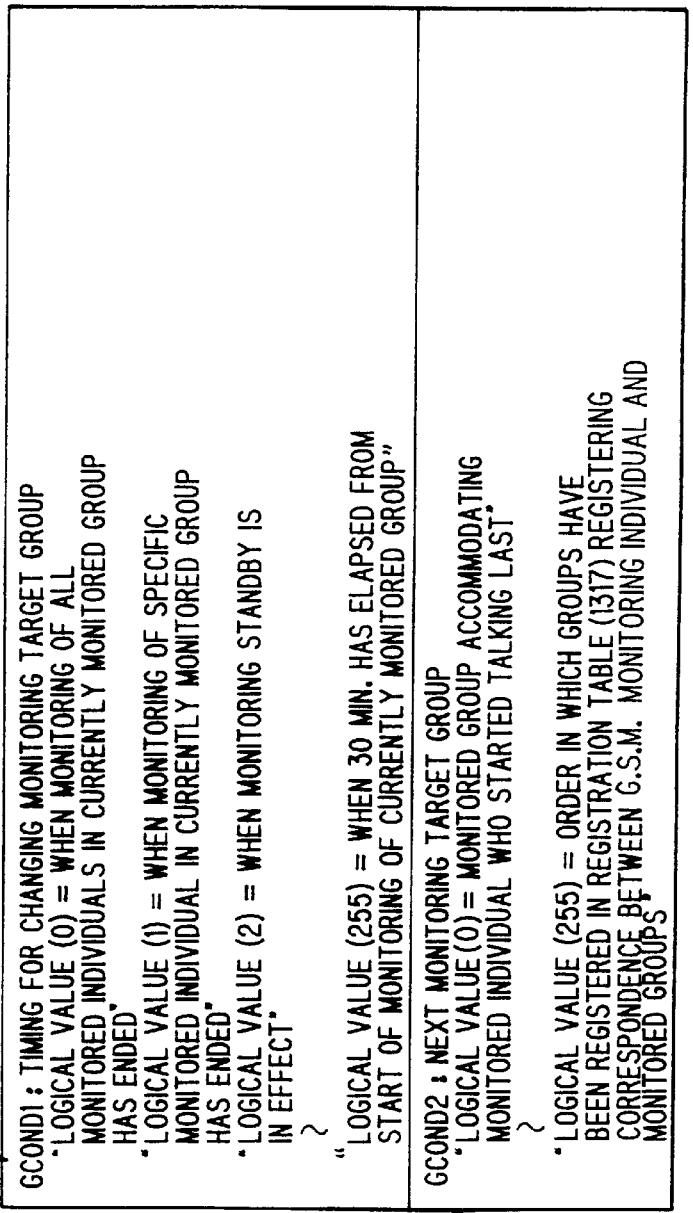

(b-6) Registration table which registers conditions for changing G.S.M. monitored group FIG. 11A illustrates the registration table 1318 that registers conditions for changing a G.S.M. monitored group, namely the table that stipulates conditions for changing a group to be monitored, and FIG. 11B is a table for describing this. By indexing in the form of the logical number of the monitoring individual in the table 1318, first and second conditions GCOND1 and GCOND2 are obtained.

The first condition GCOND1 stipulates the timing condition for changing the monitoring target group. The first condition is given by a logical value between (0) and (255). Specifically, [1] the logical value (0) signifies that a monitoring target group is to be changed to the next monitoring target group when monitoring of all monitored individuals in a monitored group currently being monitored has ended; [2] the logical value (1) signifies that the change is to be made when monitoring of a specific monitored individual in a monitored group currently being monitored has ended; [3] the logical value (2) signifies the change is to be made when monitoring standby is in effect; . . . , and [4] the logical value (255) signifies that the change is to be made upon elapse of 30 minutes from the start of monitoring of a monitored group currently being monitored.

The second condition GCOND2 stipulates the condition for deciding the next monitoring target group. The second condition is given by a logical value between (0) and (255). Specifically, [1] the logical value (0) signifies that a monitored group accommodating a monitored individual who starting talking last is to be decided upon as the next monitored group; . . . , and [2] the logical value (255) signifies that the next group to be monitored is decided upon in the order in which groups have been registered in the correspondence table 1317, which indicates the correspondence between the G.S.M. monitoring individual and groups which this monitoring individual monitors.

(b-7) G.S.M. monitoring level registration table

Figure 12:
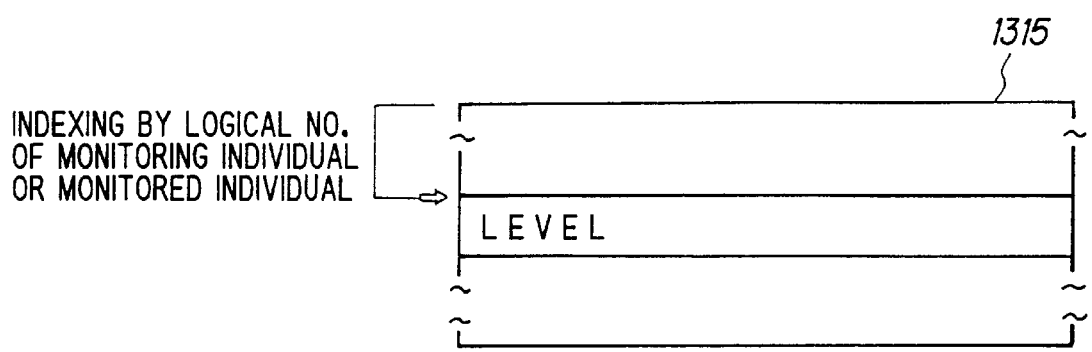
FIG. 12 is a registration table of G.S.M. monitoring levels.

FIG. 12 is a diagram for describing the G.S.M. monitoring level registration table 1315. By indexing in the form of the logical number of the monitoring individual or monitored individual, monitoring levels LEVEL of each of the monitoring and monitored individuals are obtained. Logical levels (0)~(3) can be specified as the monitoring level LEVEL, with the height of the levels being related by the inequality 0<1<2<3. In a case where the monitoring level of a monitored individual is "3", this monitored individual is given the right to refuse monitoring and can refuse monitoring. If the monitoring level of the monitoring individual is "0", "1" or "2", the monitored individual cannot refuse monitoring.

(b-8) G.S.M. group monitoring level registration table

Figure 13:
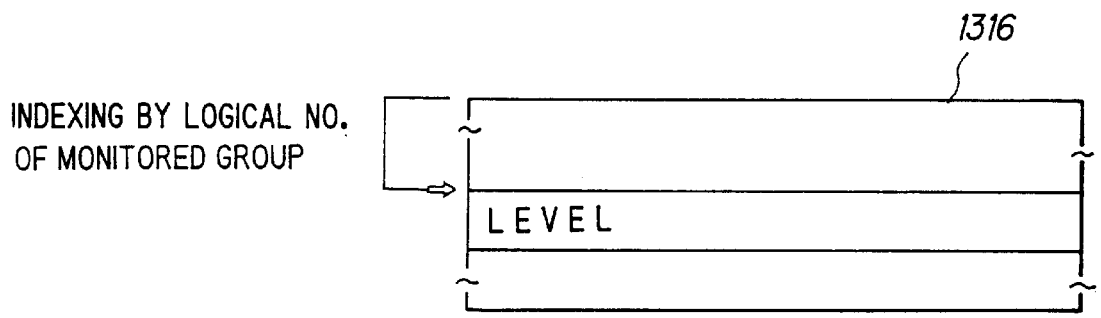
FIG. 13 is a registration table of G.S.M. group monitoring levels.

FIG. 13 is a diagram for describing the G.S.M. group monitoring level registration table 1316. By indexing in the form of the logical number of the monitored group, a monitoring level LEVEL of the monitored group is obtained. Logical levels (0)~(3) can be specified as the monitoring level LEVEL, with the height of the levels being related by the inequality 0<1<2<3.

Figure 14:
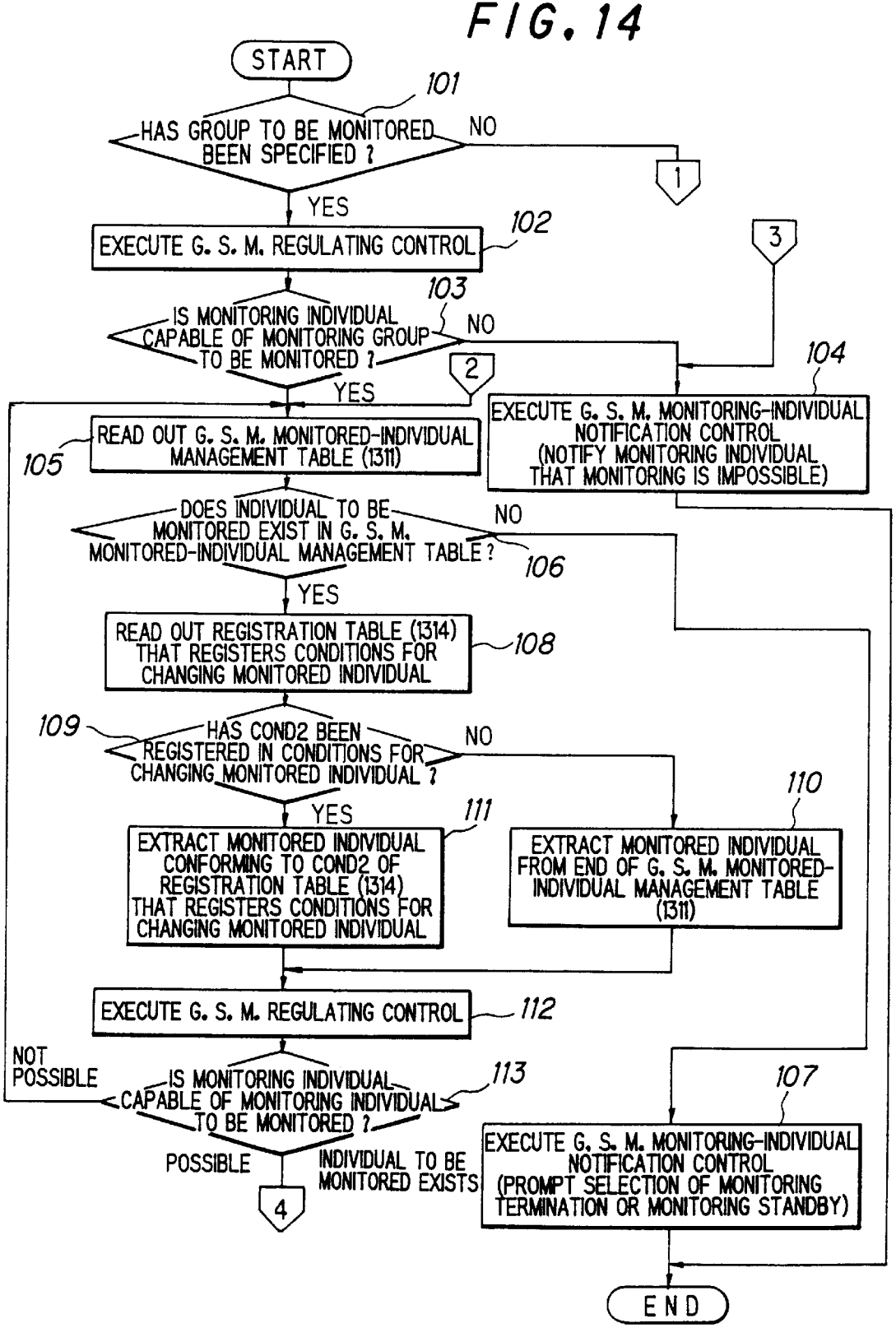
FIG. 14 is a first flowchart of G.S.M. start control.
Figure 15:
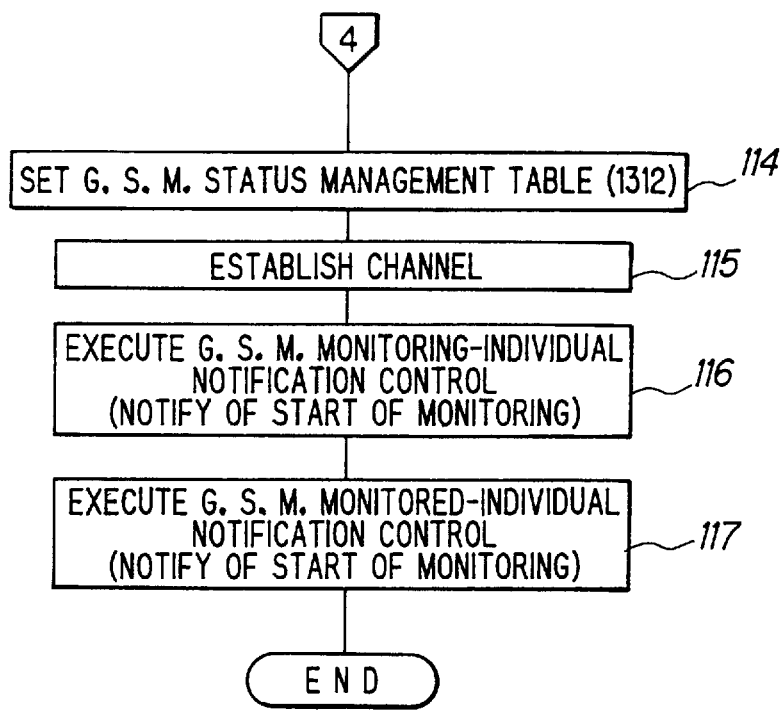
FIG. 15 is a second flowchart of G.S.M. start control.
Figure 16:
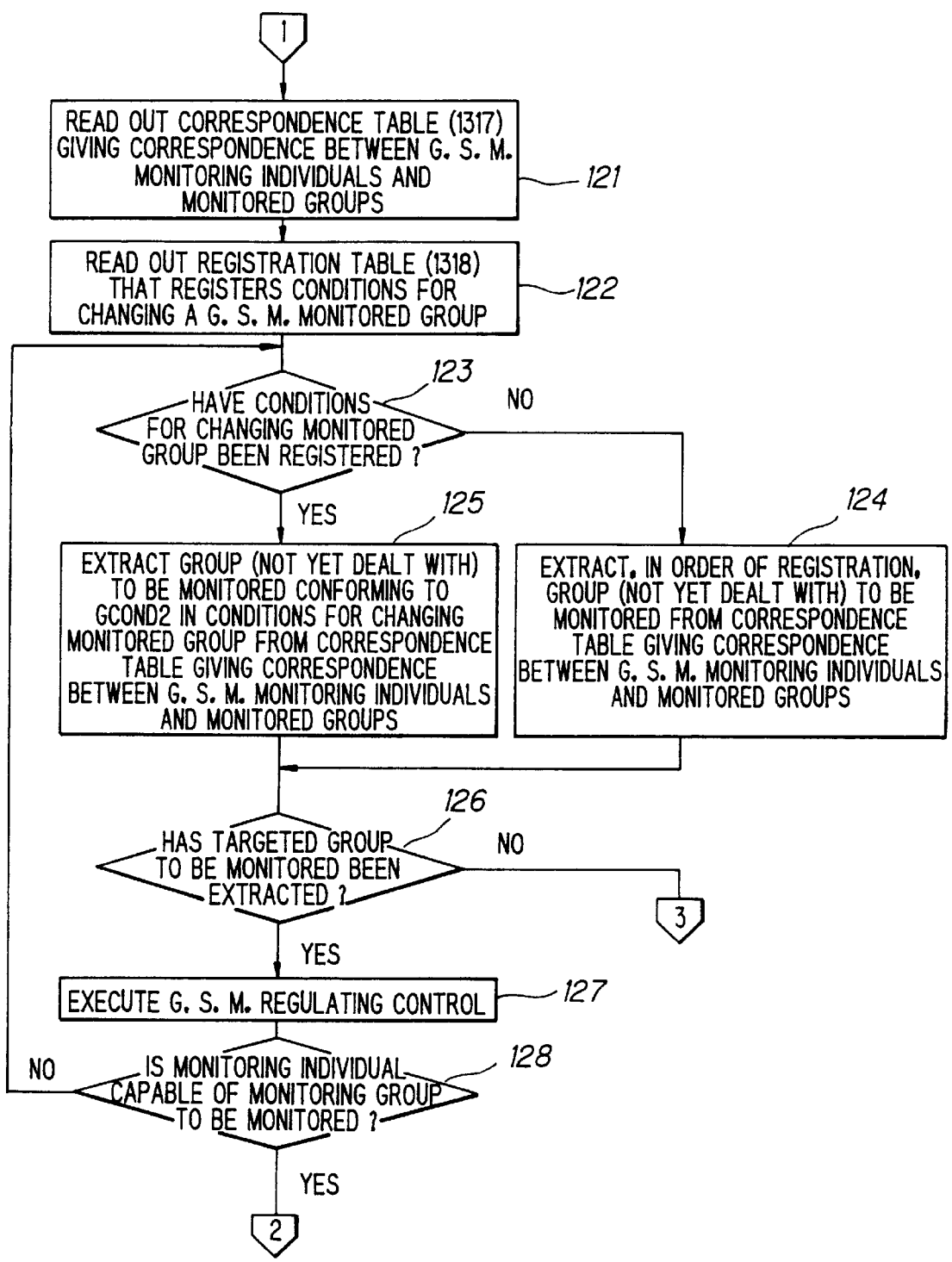
FIG. 16 is a third flowchart of G.S.M. start control.

(c) Various types of control of silent group monitoring (c-1) G.S.M. start control FIGS. 14 through 16 are flowcharts of processing for G.S.M. start control.

When the prescribed monitoring individual 12 issues a request for G.S.M. start control, the call controller 11b checks to see whether a group to be monitored has been specified (step 101). If a group to be monitored has been specified, then the monitoring level of the monitoring individual and the monitoring level of the group to be monitored are compared by G.S.M. regulation control and it is determined whether the specified group to be controlled is capable of being monitored by the monitoring individual (steps 102, 103). Monitoring is possible if the monitoring level of the monitoring individual is higher than that of the group to be monitored and is impossible if the monitoring level of the monitoring individual is lower than that of the group to be monitored.

If monitoring is impossible, control for notifying the monitoring individual is initiated, the monitoring individual is notified of the fact that monitoring is impossible and processing is then terminated (step 104). As a result, by making the monitoring level of a group of skilled monitored individuals high, it can be so arranged that this group is not monitored.

If the decision rendered at step 103 is that monitoring is possible, then the call controller 11b reads out the monitored individual management table 1311 (step 105). and determines whether a talking individual to be monitored exists in the specified group to be monitored (step 106). If an individual to be monitored does not exist, the monitoring individual is so notified by monitoring-individual notification control and is prompted to select termination of monitoring or standby (step 107), in which the system stands by until a monitored individual in the monitored group starts talking. The subsequent flow of processing is decided by the selection made by the monitoring individual.

If a talking individual to be monitored is found to be present in the decision of step 106, the call controller 11b reads out the registration table 1314 that registers conditions for changing the monitored individual (step 108), obtains the conditions for changing the monitored individual from the registration table 1314 based upon the logical number of the monitoring.individual and checks to see whether the second condition COND2 has been registered (step 109). If the second condition has not been registered, the call controller 11b extracts the monitored individual from the end of the monitored individual management table 1311, namely the monitored individual who started talking last (step 110). On the other hand, if the decision rendered at step 109 is that the second condition COND2 has been registered, then the call controller 11b extracts the monitored individual conforming to the second condition from the monitored individual management table 1311 (step 111).

After the individual to be monitored is extracted in accordance with steps 110, 111, it is determined by G.S.M. regulating control whether the monitoring individual is capable of monitoring the extracted individual to be monitored (steps 112, 113). Monitoring is possible if the monitoring level of the monitoring individual is higher than that of the individual to be monitored and is impossible if the monitoring level of the monitoring individual is lower than that of the individual to be monitored. As a result, by making the monitoring level of a skilled individual to be monitored high, it can be so arranged that this individual is not monitored.

If monitoring is impossible, the processing from step 105 onward is repeated for the purpose of extracting the next targeted individual to be monitored. If monitoring is possible, on the other hand, then the call controller 11b sets the monitoring status of the monitoring individual (namely the fact that monitoring is in progress, the name of the group to be monitored, the name of the individual to be monitored and the mixer trunk used) in the G.S.M. status management table 1312 and deletes the targeted individual to be monitored from the monitored individual management table 1311 (step 114). Next, the call controller 11b controls the network 11a and establishes a channel (step 115) so as to make monitoring possible, gives notice of the start of monitoring by G.S.M. monitoring-individual notification control, notifies the individual to be monitored of the start of monitoring by G.S.M. monitoring-individual notification control and terminates G.S.M. start control (steps 116, 117).

In a case where the decision rendered at step 101 is that an individual to be monitored has not been specified, the call controller 11b reads out the correspondence table 1317 giving the correspondence between G.S.M. monitoring individuals and monitored groups and the registration table 1318 that registers conditions for changing a G.S.M. monitored group (steps 121, 122). The call controller 11b then obtains the conditions for changing the group to be monitored from the registration table 1318 and checks to see whether the second condition GCOND2 has been registered (step 123). If the second condition has not been registered, the call controller 11b extracts a group to be monitored, which has not yet been dealt with, from the correspondence table 1317 in accordance with the order in which groups have been registered (step 124). On the other hand, if the decision rendered at step 123 is that the second condition GCOND2 has been registered, then the call controller 11b extracts the untreated group to be monitored conforming to the second condition from the correspondence table 1317 giving the correspondence between G.S.M. monitoring individuals and monitored groups (step 125).

The call controller 11b then checks to see whether a targeted group to be monitored could be extracted (step 126). If such a group could not be extracted, the call controller 11b, by the processing of step 104, notifies the monitoring individual of the fact that monitoring is impossible and terminates G.S.M. start control.

If it is found at step 126 that a targeted group to be monitored could be extracted, then the monitoring level of the monitoring individual and the monitoring level of the group to be monitored are compared and it is determined whether the monitoring individual is capable of monitoring this group (steps 127, 128). Monitoring is possible if the monitoring level of the monitoring individual is higher than that of the group to be monitored and is impossible if the monitoring level of the monitoring individual is lower than that of the group to be monitored.

If monitoring is impossible, the processing from step 123 onward is repeated for the purpose of extracting the next targeted group to be monitored. If monitoring is possible, on the other hand, then the call controller 11b executes processing from step 105 onward for the purpose of extracting a targeted individual to be monitored from the extracted group to be monitored.

(c-2) Processing for controlling change of G.S.M. monitored individual

The call controller 11b starts control for changing a monitored individual (1) when the monitoring individual has requested a change of monitored individual by performing an operation at the terminal; (2) when monitoring has been refused by a monitored individual having the right to refuse monitoring; or (3) when conditions for changing a monitored individual automatically have been met.

Figure 17:
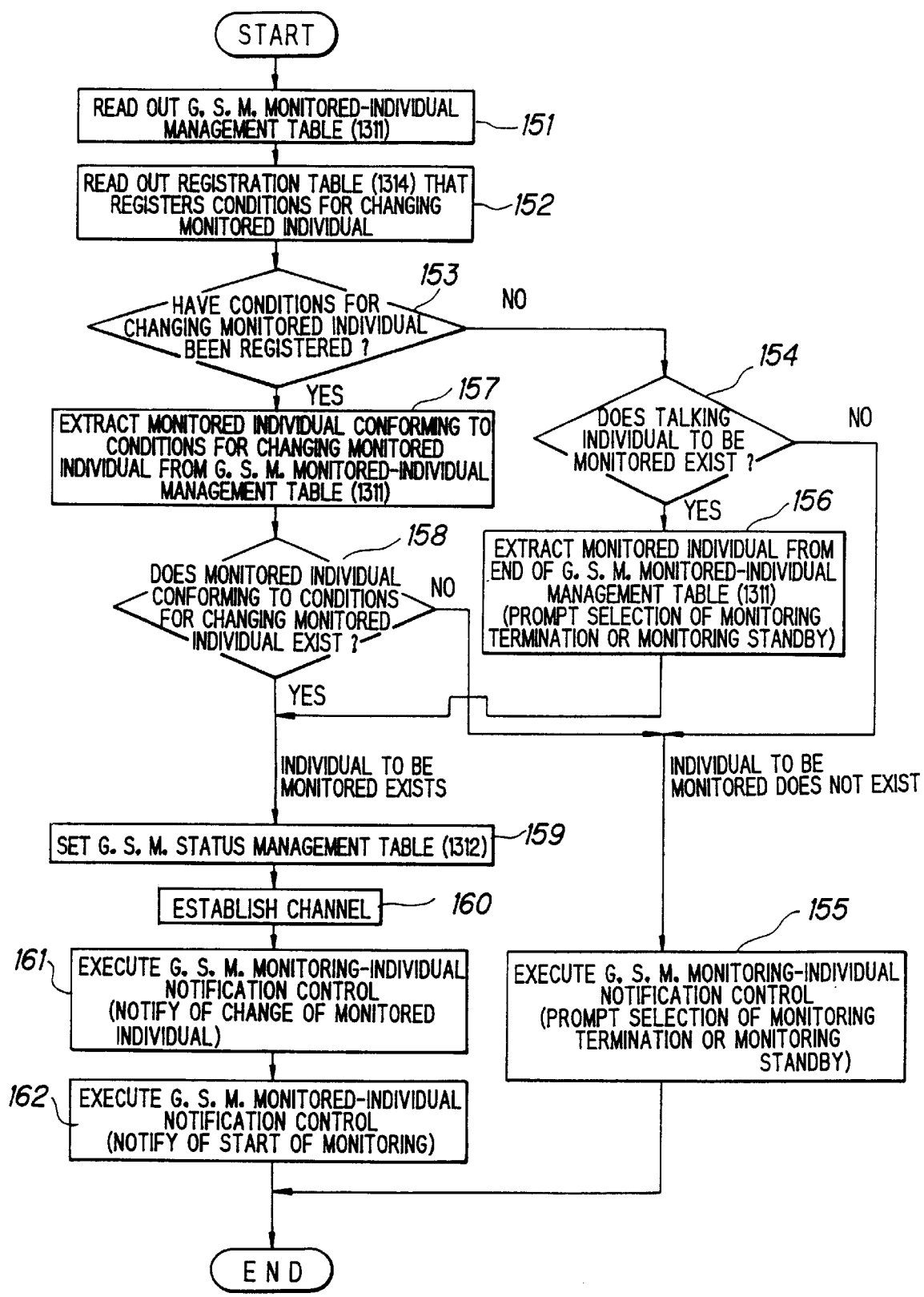
FIG. 17 is a flowchart of control for changing a G.S.M. individual to be monitored.

FIG. 17 is a flowchart of processing of control for changing a G.S.M. individual to be monitored.

If a change of monitored individual has been request, the call controller 11b reads out the monitored individual management table 1311 and the registration table 1314 that registers conditions for changing the monitored individual (steps 151, 152). Next, the call controller 11b searches the registration table 1314 based upon the logical number of the monitoring individual and determines whether the conditions for changing the monitored individual have been registered (step 153). If the conditions have not been registered, then the call controller 11b refers to the management table 1311 and determines whether a talking individual to be monitored exists in the group currently being monitored (step 154). If such an individual does not exist, then the call controller 11b so notifies the monitoring individual in accordance with G.S.M. monitoring-individual notification control and prompts the monitoring individual to select termination of monitoring or standby (step 155), in which the system stands by until any monitored individual in the monitored group starts talking. The subsequent flow of processing is decided by the selection made by the monitoring individual. On the other hand, if a talking individual to be monitored is found to exist, the call controller 11b extracts the monitored individual from the end of the monitored individual management table 1311, namely the monitored individual who started talking last (step 156).

If the decision rendered at step 153 is that the conditions for changing monitored individual have been registered, then the call controller 11b extracts the monitored individual conforming to these conditions from the monitored individual management table 1311 (step 157). Next, the call controller 11b checks to see whether a monitored individual conforming to the conditions for changing the monitored individual has been found (step 158). If such an individual has not been found, then the call controller 11b so notifies the monitoring individual by the processing of step 155 and prompts the monitoring individual to select end of monitoring or standby, in which the system stands by for any monitored individual in the monitored group to start talking.

If an individual to be monitored conforming to the conditions for changing the monitored individual has been found, then the call controller 11b sets the monitoring status of the monitoring individual (namely the fact that monitoring is in progress, the name of the group to be monitored, the name of the individual to be monitored and the mixer trunk used) in the G.S.M. status management table 1312 and deletes the targeted individual to be monitored from the monitored individual management table 1311 (step 159).

Next, the call controller 11b controls the network 11a and establishes a channel (step 160) so as to make monitoring possible, gives notice of the start of monitoring by G.S.M. monitoring-individual notification control, notifies the individual to be monitored of the start of monitoring by G.S.M. monitoring-individual notification control and terminates control for changing the monitored individual (steps 161, 162).

(c-3) Processing for controlling change of monitored group

The call controller 11b starts control for changing a monitored group (1) when the monitoring individual has requested a change of monitored group by performing an operation at the terminal; (2) when monitoring has been requested by a monitored group; or (3) when conditions for changing a monitored group automatically have been met.

Figure 18:
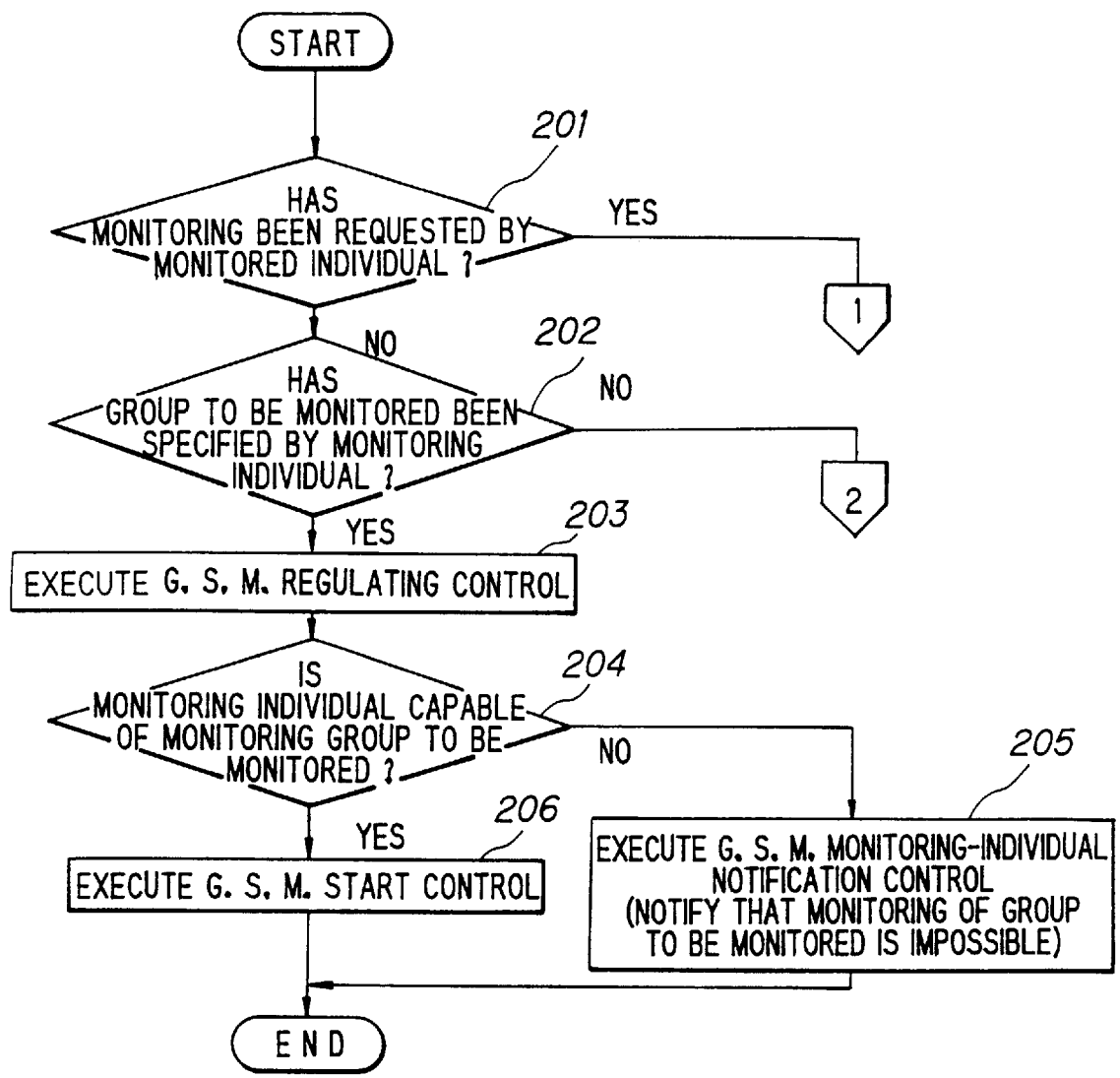
FIG. 18 is a first flowchart of control for changing a group of G.S.M. individuals to be monitored.
Figure 19:
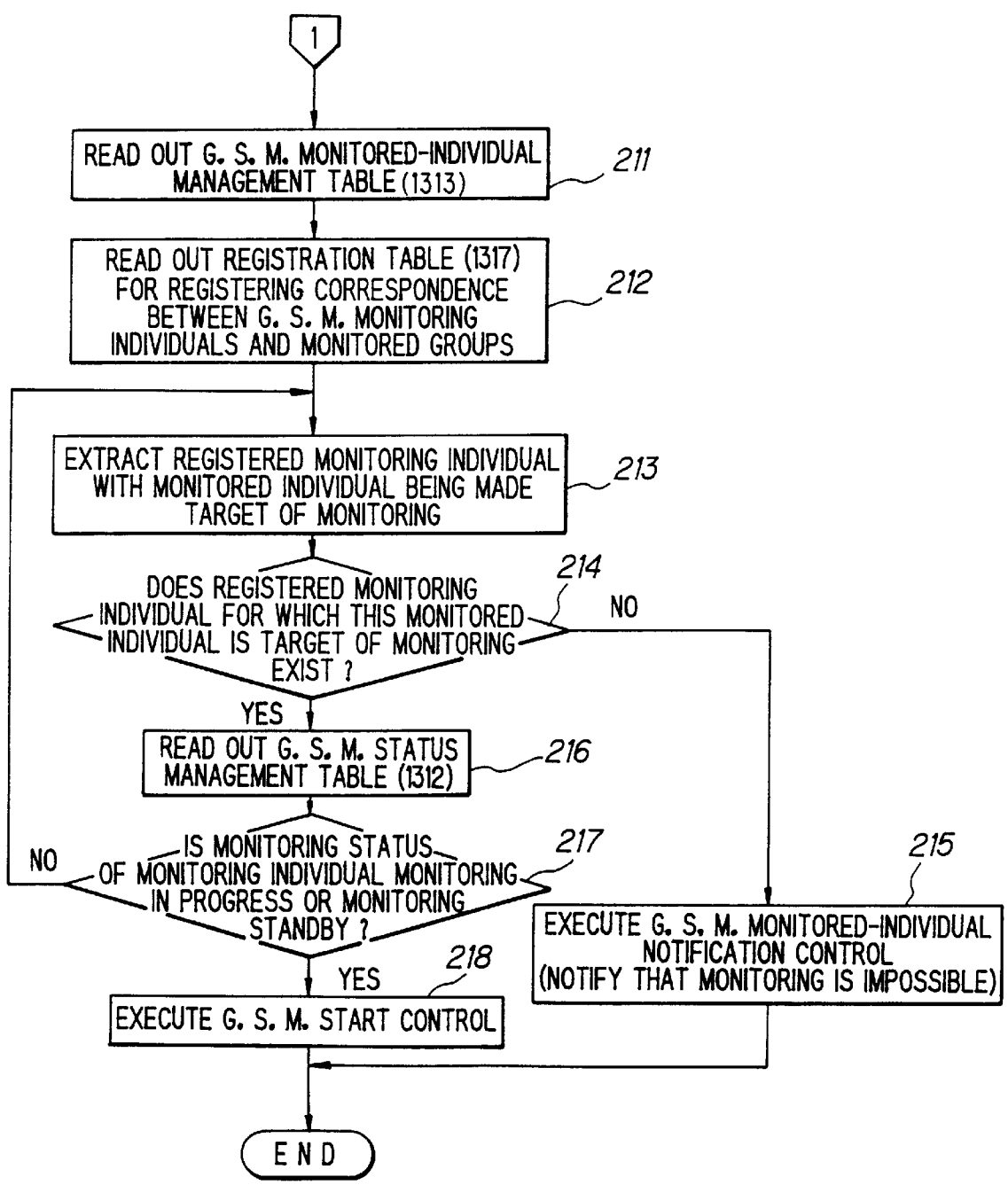
FIG. 19 is a second flowchart of control for changing a group of G.S.M. individuals to be monitored.
Figure 20:
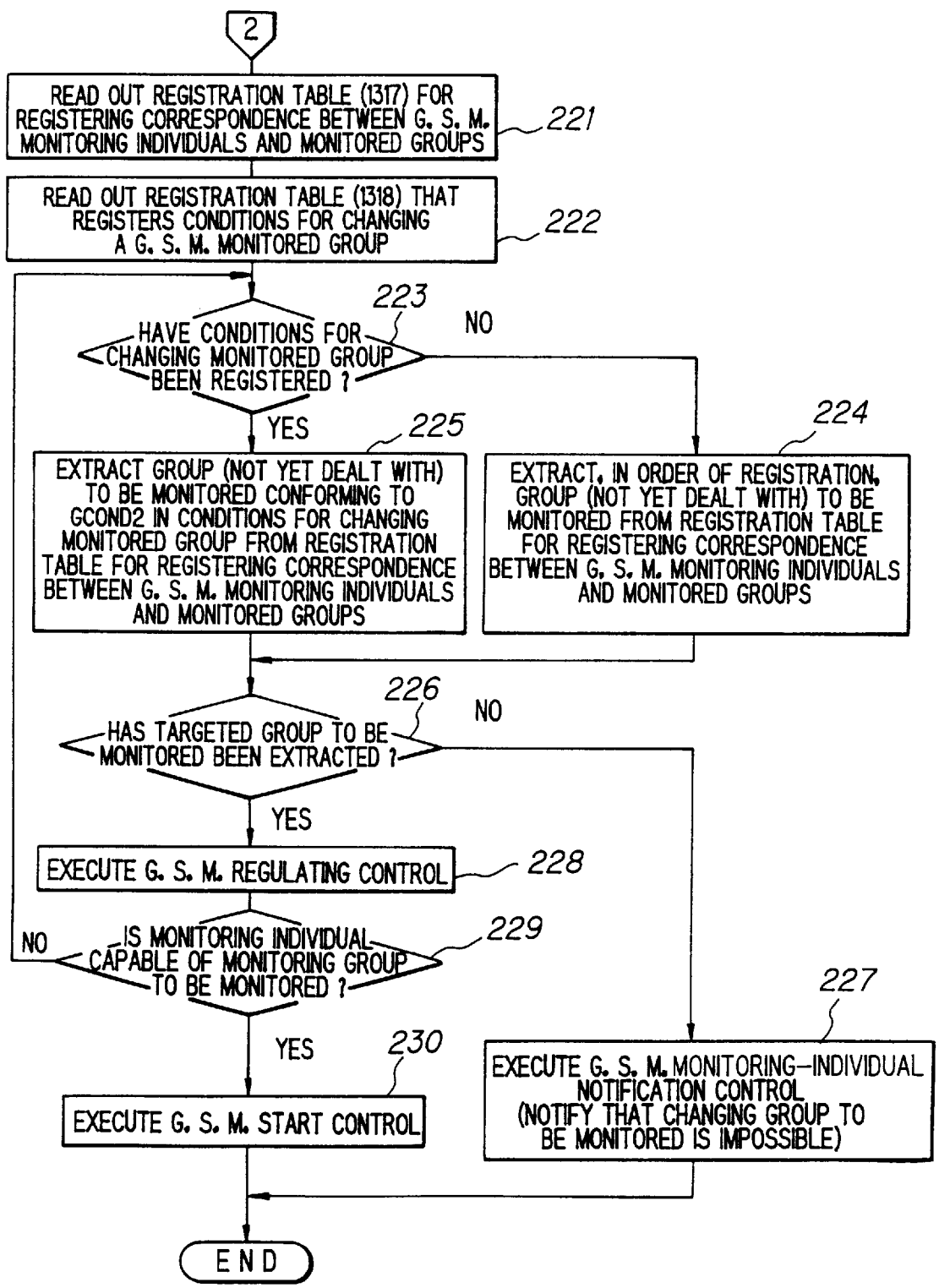
FIG. 20 is a third flowchart of control for changing a group of G.S.M. individuals to be monitored.

FIGS. 18~20 are flowcharts of processing of control for changing a G.S.M. group to be monitored.

If a change of group to be monitored has been requested, the call controller 11b determines whether this is the result of a monitoring request from a monitored individual (step 201). When an inexperienced monitored individual having a low level of skill answers a customer, there are cases where this individual wishes to request assistance from the monitoring individual. In such cases the monitored individual requests monitoring.

If it is determined at step 201 that the request for change of group to be monitored is not the result of a monitoring request from a monitored individual, the call controller 11b determines whether a group to be monitored has been specified by the monitoring individual (step 202). If a group to be monitored has been specified, then, in accordance with G.S.M. regulating control, the call controller 11b compares the monitoring level of the monitoring individual and the monitoring level of the group to be monitored and determines whether the monitoring individual is capable of monitoring the specified group to be monitored (steps 203, 204). Monitoring is possible if the monitoring level of the monitoring individual is higher than that of the group to be monitored and is impossible if the monitoring level of the monitoring individual is lower than that of the group to be monitored.

If monitoring is impossible, then, in accordance with G.S.M. monitoring-individual notification control, the call controller 11b notifies the monitoring individual of the fact that changing the monitored individual is impossible and then terminates processing (step 205). As a result, by making the monitoring level of a group of skilled monitored individuals high, it can be so arranged that this group is not monitored.

If the decision rendered at step 204 is that monitoring is possible, then an individual to be monitored is extracted and monitoring is started in accordance with the processing from step 105 (G.S.M. start control) onward (step 206).

On the other hand, if the decision rendered at step 201 is that monitoring has been requested by a monitored individual, then the call controller 11b read out the correspondence table 1313 indicating the correspondence between G.S.M. monitored groups and monitored individuals and the correspondence table 1317 giving the correspondence between G.S.M. monitoring individuals and monitored groups (steps 211, 212). The call controller 11b then refers to these correspondence tables 1313, 1317 and extracts a monitoring individual for whom the monitored group to which the monitored individual that issued the monitoring request belongs is the monitoring target group (step 213).

Next, the call controller 11b determines the existence of a monitoring individual for whom the monitored group to which the monitored individual that issued the monitoring request belongs serves as the monitoring target group (step 214). If this monitoring individual does not exist, then, in accordance with G.S.M. monitoring-individual notification control, the call controller 11b notifies the monitored individual of the fact that monitoring is impossible (step 215) and terminates processing.

If the decision rendered at step 214 is that the monitoring individual exists, then the call controller 11b read out the G.S.M. status management table 1312 (step 216) and determines whether STATUS of the monitoring individual is indicative of monitoring in progress or monitoring standby (step 217). If the status is neither monitoring in progress nor monitoring standby, then the call controller 11b repeats the processing from step 213 onward and looks for a monitoring individual that is currently monitoring or currently in monitoring standby.

If the decision rendered at step 217 is that STATUS of the monitoring individual is indicative of monitoring in progress or monitoring standby, then, in accordance with G.S.M. start control, the call controller 11b allows the monitoring individual to monitor the monitored individual that issued the monitoring request (step 218). As a result, the monitoring individual is capable of interrupting the conversion between the monitored individual and the customer so that the customer can be dealt with properly.

If the decision rendered at step 202 is that a monitored individual has not been specified by the monitoring individual, then the call controller 11b reads out the correspondence table 1317 giving the correspondence between G.S.M. monitoring individuals and monitored groups and the registration table 1318 that registers conditions for changing a G.S.M. monitored group (steps 221, 222). The call controller 11b then searches the registration table 1318 based upon the logical number of the monitoring individual and determines whether conditions for changing the monitored group have been registered (step 223). If the conditions have not been registered, then the call controller 11b extracts a group to be monitored, which has not yet been dealt with, from the correspondence table 1317 in accordance with the order in which groups have been registered (step 224). On the other hand, if the decision rendered at step 223 is that the conditions for changing the monitored group have not been registered, then the call controller 11b extracts the untreated group to be monitored conforming to the second condition GCOND2 from the correspondence table 1317 giving the correspondence between G.S.M. monitoring individuals and monitored groups (step 225).

The call controller 11b then checks to see whether a targeted group to be monitored could be extracted (step 226). If such a group could not be extracted, the call controller 11b, in accordance with G.S.M. monitoring-individual notification control, notifies the monitoring individual of the fact that changing the monitored group is impossible and terminates control for changing a monitored group (step 227).

If it is found at step 226 that a targeted group to be monitored could be extracted, then the monitoring level of the monitoring individual and the monitoring level of the group to be monitored are compared by G.S.M. regulating control and it is determined whether the monitoring individual is capable of monitoring the specified group (steps 228, 229). Monitoring is possible if the monitoring level of the monitoring individual is higher than that of the group to be monitored and is impossible if the monitoring level of the monitoring individual is lower than that of the group to be monitored. If monitoring is impossible, the processing from step 223 onward is repeated for the purpose of extracting the next targeted group to be monitored. If monitoring is possible, then the call controller 11b executes processing from step 105 (G.S.M. start control) onward for the purpose of extracting a targeted individual to be monitored from the extracted group to be monitored.

(c-4) G.S.M. termination control

Figure 21:
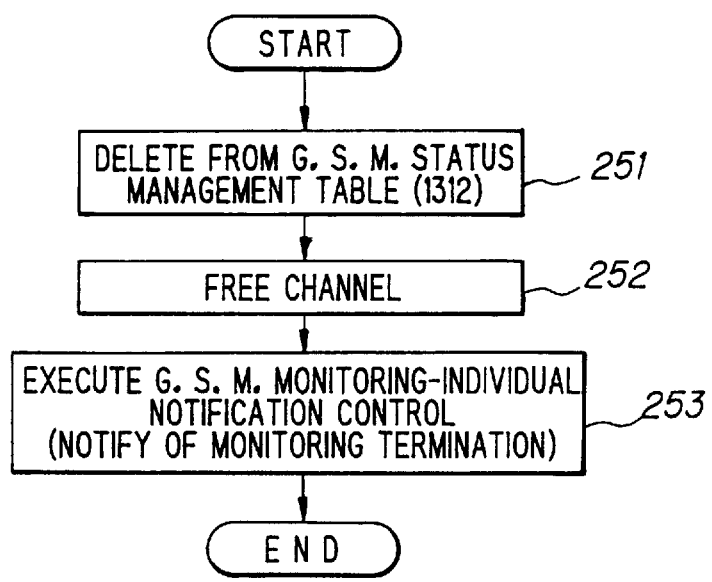
FIG. 21 is a flowchart of G.S.M. termination control.

FIG. 21 is a flowchart of processing for G.S.M. termination control.

When a monitoring individual currently performing monitoring gives notice of termination of monitoring by performing an operation at the terminal, the call controller 11b deletes the status management data of this monitoring individual from the G.S.M. status management table 1312 (step 251). As a result, another monitoring individual becomes capable of using the mixer trunk that was being used by the above-mentioned monitoring individual. Next, the call controller 11b frees the channel (step 252) and, in accordance with the G.S.M. monitoring-individual notification control, notifies the monitoring individual of end of monitoring (step 253) and terminates processing.

(c-5) G.S.M. standby control

Figure 22:
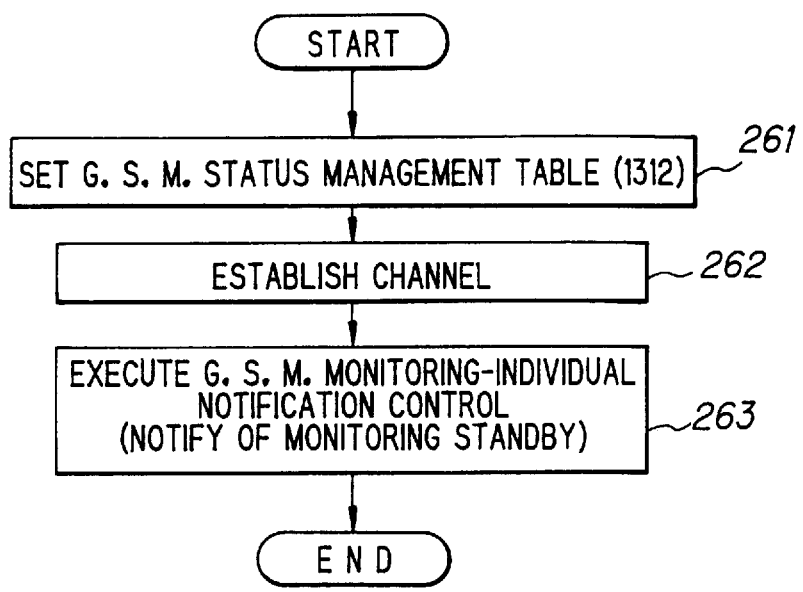
FIG. 22 is a flowchart of G.S.M. standby control.

FIG. 22 is a flowchart of processing for G.S.M. standby control in a case where a standby request has been issued by a monitoring individual. If standby is designated by the monitoring individual, the call controller 11b sets STATUS of the monitoring individual in the G.S.M. status management table 1312 to standby, establishes a channel to establish the standby state (steps 261, 262) and then notifies the monitoring individual of monitoring standby in accordance with G.S.M. monitoring-individual notification control (step 263).

(c-6) G.S.M. regulating control

The call controller 11b executes control for monitoring regulation when a monitored group is change, when a monitored individual is changed or when a monitored individual refused monitoring.

Figure 23:
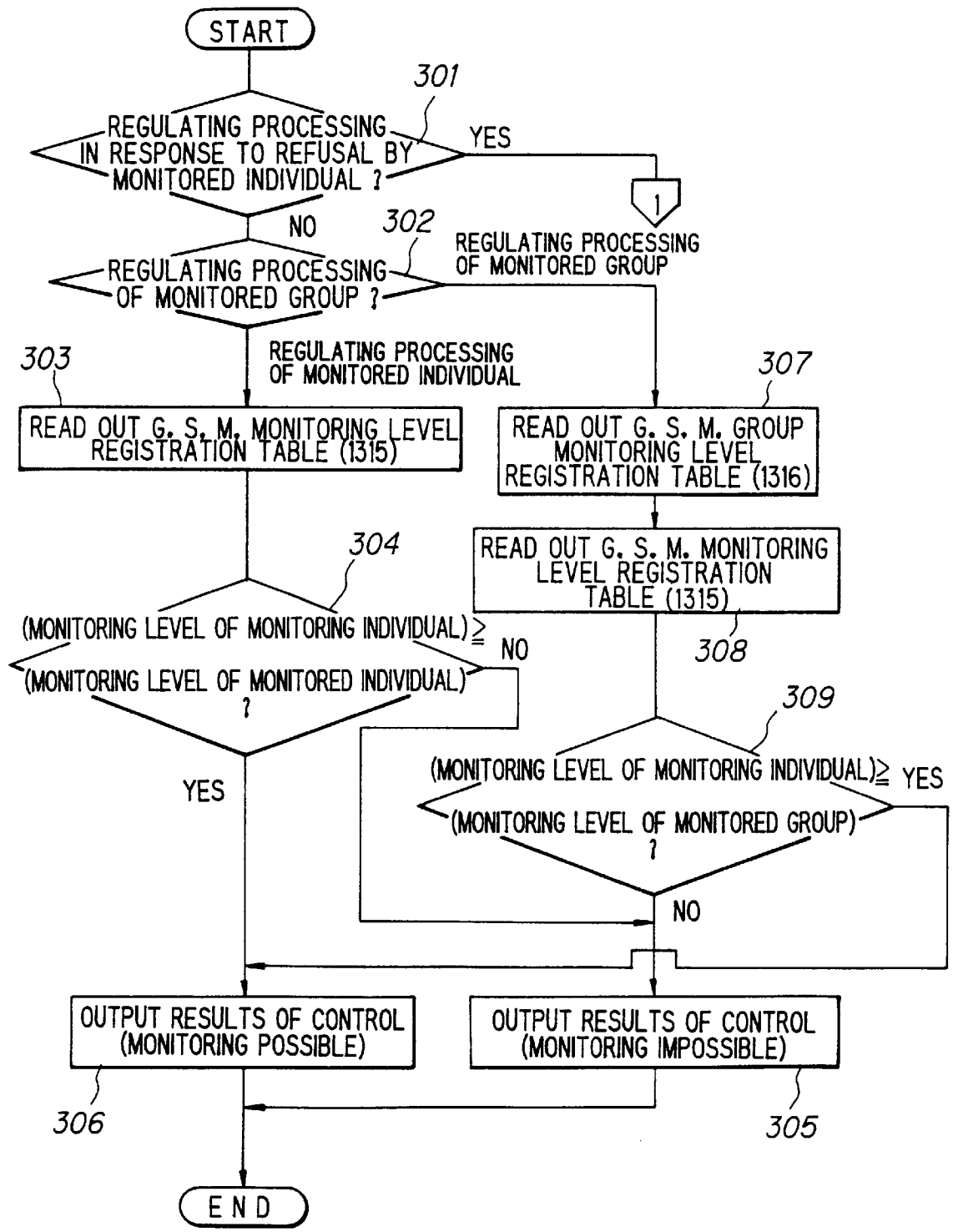
FIG. 23 is a flowchart of first G.S.M. limiting control.
Figure 24:
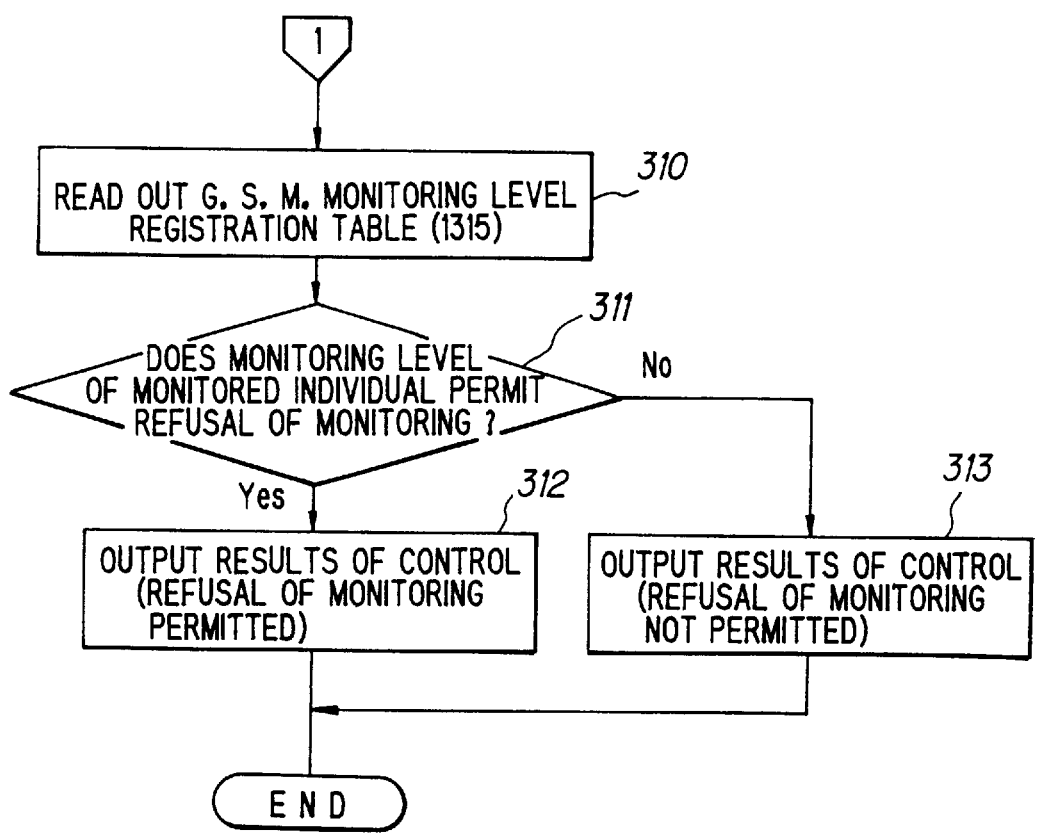
FIG. 24 is a flowchart of second G.S.M. limiting control.

FIGS. 23 and 24 are flowcharts of processing for G.S.M. regulating control.

If regulating control is requested, the call controller 11b determines whether this is regulating control processing in response to monitoring refusal by a monitored individual (step 301). If this is not regulating control processing in response to monitoring refusal by a monitored individual, the call controller 11b determines whether it is regulating control processing of a monitored group or regulating control processing of a monitored individual (step 302).

If the processing is regulating control processing of a monitored individual, then the call controller 11b reads out the G.S.M. monitoring level registration table 1315, obtains monitoring levels LM, Lm of the monitoring individual and monitored individual, respectively, from the registration table 1315 (step 303) and determines whether $LM \geq Lm$ holds (step 304). If $LM<Lm$ holds, then the monitored individual cannot be monitored and the call controller 11b outputs the fact that monitoring is impossible (step 305). If $LM \geq Lm$ holds, the call controller 11b outputs the fact that monitoring is possible (step 306). Regulating control is then terminated.

If the decision rendered at step 302 is that processing is regulating control processing of a monitored group, then the call controller 11b reads out the G.S.M. group monitoring level registration table 1316 and the G.S.M. monitoring level registration table 1315, obtains a monitoring level Lg of the monitored group and the monitoring level LM of the monitoring individual from these registration tables (steps 307, 308) and determines whether $LM \geq Lg$ holds (step 309). If $LM<Lg$ holds, the monitored individual cannot be monitored and the call controller 11b outputs the fact that monitoring is impossible (step 305). If $LM \geq Lg$ holds, the call controller 11b outputs the fact that monitoring is possible (step 306). Regulating control is then terminated.

If the decision rendered is that the processing is regulating control processing based upon monitoring refusal by a monitored individual, then the call controller 11b reads out the G.S.M. monitoring level registration table 1315, obtains the monitoring level Lm of the monitored individual from the registration table 1315 (step 310) and determines whether the monitoring level Lm of the monitored individual is a level (=3) which permits monitoring to be refused, i.e., whether the monitored individual has the right to refuse monitoring (step 311). If the right to refuse monitoring has been given, then the call controller 11b outputs the fact that refusal of monitoring is possible (step 312). If the right to refuse monitoring has not been given, then the call controller 11b outputs the fact refusal of monitoring is not possible (step 313). Regulating control is then terminated.

(c-7) G.S.M. monitoring-individual notification processing

Figure 25:
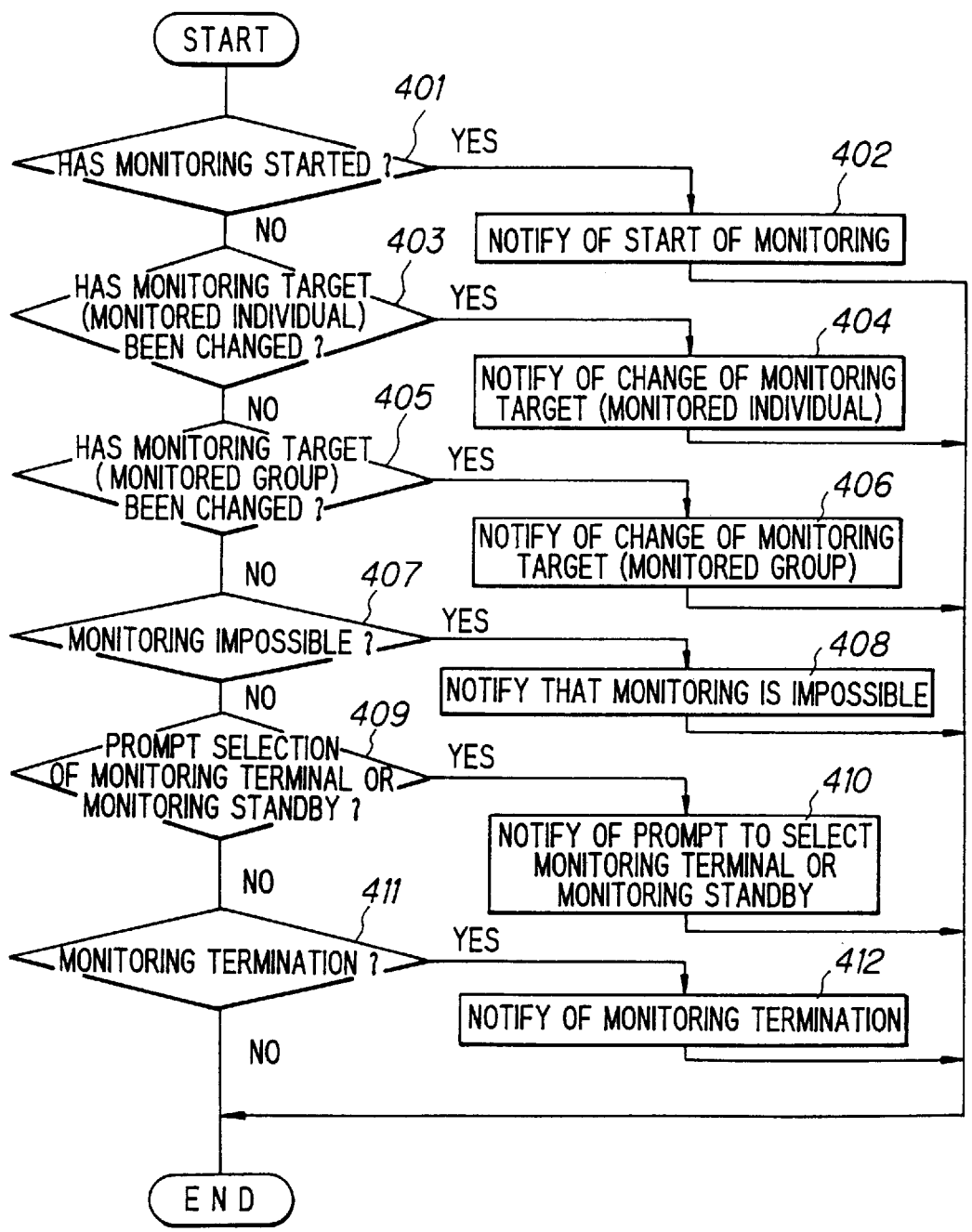
FIG. 25 is a flowchart of processing for notifying a G.S.M. monitoring individual of monitoring status.

In control for silent group monitoring, the call controller 11b notifies the monitoring individual of the status of monitoring (start of monitoring, change of monitored individual, change of monitored group, impossibility of monitoring, selection of monitoring start or monitoring standby and termination of monitoring). FIG. 25 is a flowchart of processing for such notification of the monitoring individual.

The call controller 11b successively determines whether monitoring has started (step 401), whether a monitored individual has been changed (step 403), whether a monitored group has been changed (step 405), whether monitoring is impossible (step 407), whether it is necessary to prompt selection of monitoring termination or monitoring standby (step 409) and whether monitoring is to be terminated (step 411). If monitoring is started, the call controller 11b notifies the monitoring individual of start of monitoring (step 402). If a monitored individual is changed, the call controller 11b notifies the monitoring individual of the change of monitored individual (step 404). If a monitored group is changed, the call controller 11b notifies the monitoring individual of change of monitored group (step 406). If monitoring is impossible, the call controller 11b notifies the monitoring individual of the impossibility of monitoring (step 408). If it is necessary to prompt selection of monitoring termination or monitoring standby, the call controller 11b notifies the monitoring individual to make the selection (step 410). If monitoring is terminated, the call controller 11b notifies the monitoring individual of monitoring termination (step 412).

(c-8) G.S.M. monitored-individual notification processing

In control for silent group monitoring, the call controller 11b (1) notifies a monitored individual of start of monitoring and (2) notifies a monitored individual of the fact that refusal of monitoring.is impossible when refusal of monitoring has been requested by a monitored individual not given this right.

Figure 26:
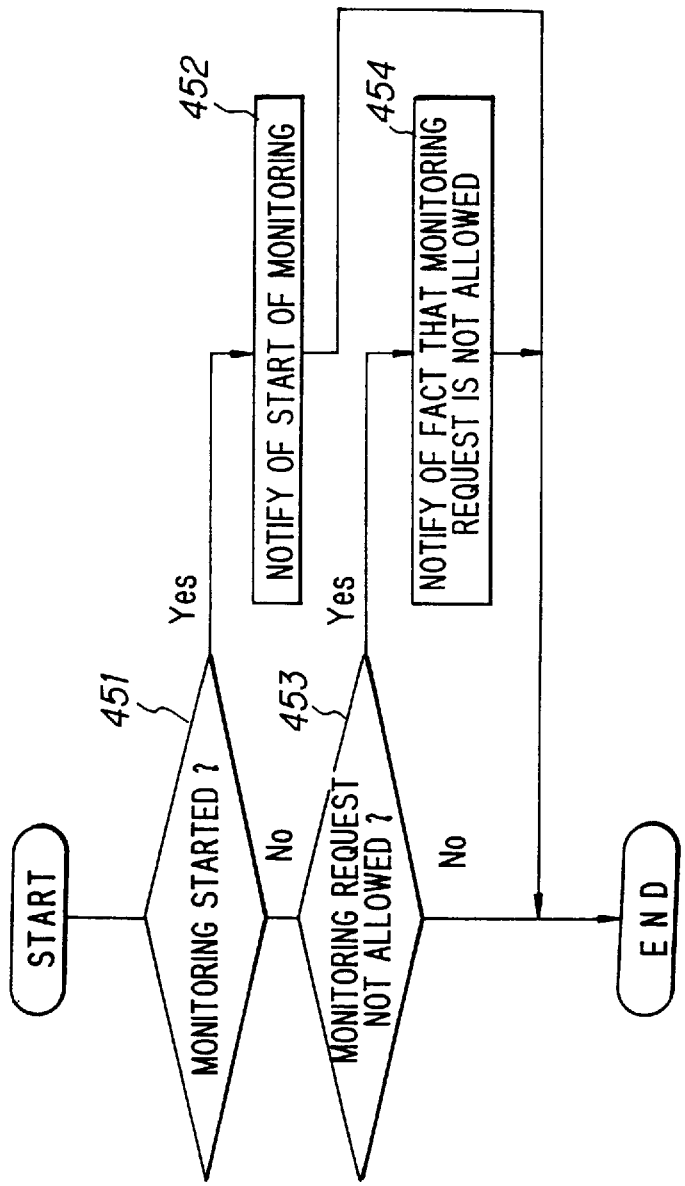
FIG. 26 is a flowchart of processing for notifying a G.S.M. individual to be monitored.

FIG. 26 is a flowchart of processing for such notification of the monitored individual. The call controller 11b successively determines whether monitoring has started (step 451) and whether a monitoring refusal request has been issued by a monitored individual not having this right (step 453). If monitoring is started, the call controller 11b so notifies the monitored individual (step 452). If refusal of monitoring has been requested by a monitored individual not having this right, then the call controller 11b informs the monitored individual of the fact that refusal of monitoring is impossible (step 454).

(c-9) Processing for G.S.M. individual to be monitored

The call controller 11b oversees talking monitored individuals in each monitored group, registers a monitored individual who has started talking anew in the monitored individual management table 1311 and deletes a talking monitored individual for which monitoring has started from the management table 1311.

Figure 27:
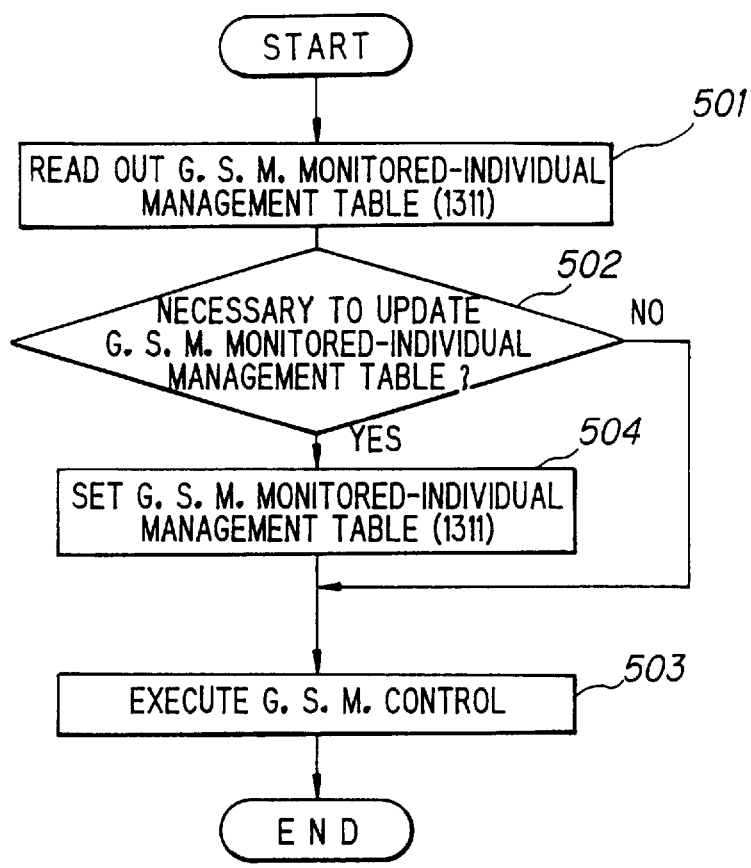
FIG. 27 is a flowchart of processing for supervising a G.S.M. individual to be monitored.

FIG. 27 is a flowchart of processing for managing G.S.M. individuals to be monitored. The call controller 11b reads out the monitored individual management table 1311 (step 501) and determines whether it is necessary to update the registration table 1311 (step 502). If updating is unnecessary, then the call controller 11b performs other G.S.M. control (step 503). However, if there is a monitored individual who has started talking anew, the call controller 11b registers this monitored individual in the monitored individual management table 1311. Alternatively, if monitoring of a new individual to be monitored is started, the call controller 11b deletes this monitored individual from the management table 1311. This registration or deletion is executed at step 504. This is followed by execution of other G.S.M. control.

(c-10) Processing for registering G.S.M. conditions

The following can be entered from the maintenance console 16: (1) the correspondence table 1313 indicating the correspondence between G.S.M. monitored groups and monitored individuals, (2) the registration table 1314 that registers conditions for changing the monitored individual, (3) the G.S.M. monitoring level registration table 1315, (4) the G.S.M. group monitoring level registration table 1316, (5) the correspondence table 1317 giving the correspondence between G.S.M. monitoring individuals and monitored groups, and (6) the registration table 1318 that registers conditions for changing a G.S.M. monitored group. These tables can be registered in the memory device 11c under the control of the call controller 11b.

Figure 28:
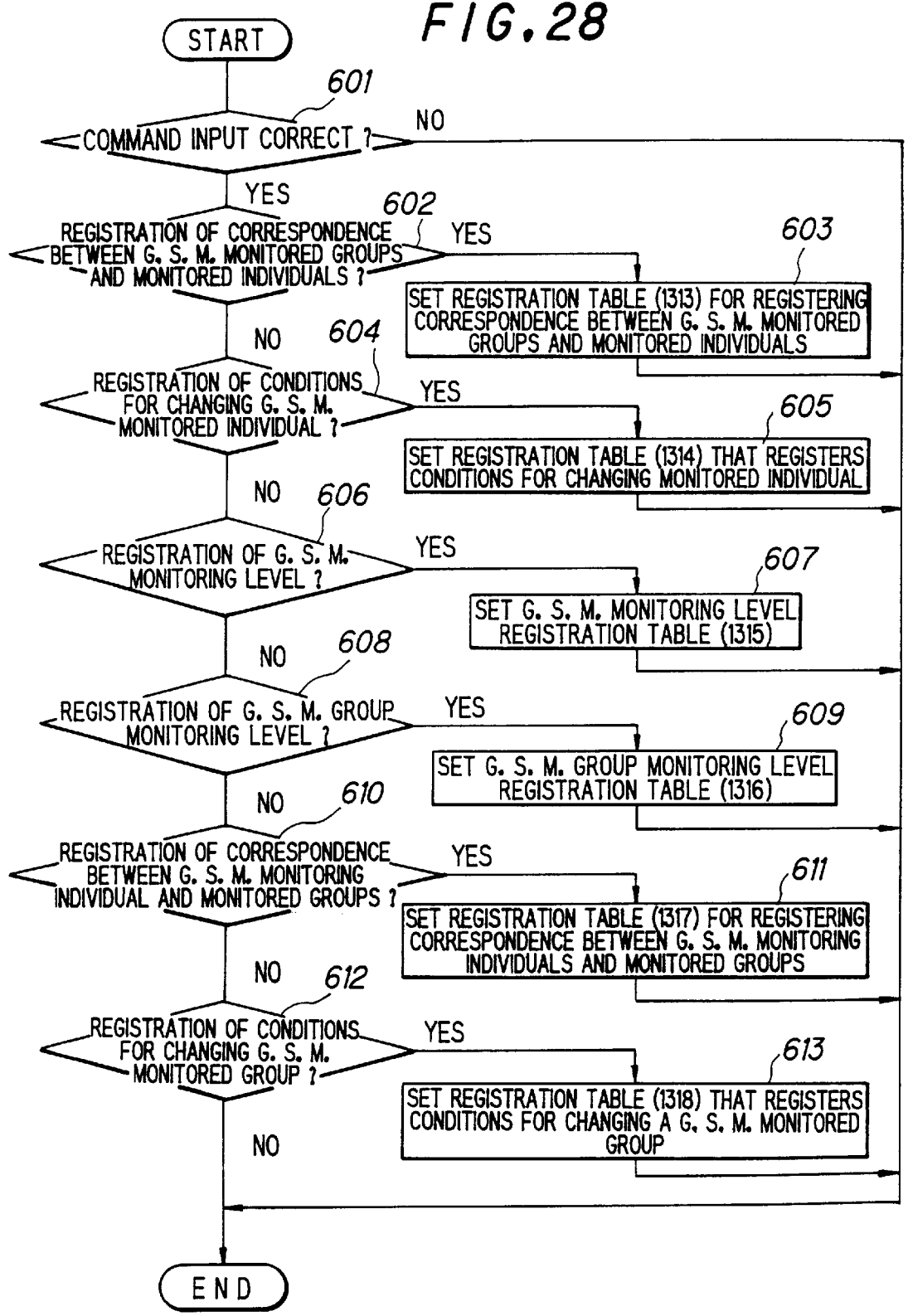
FIG. 28 is a flowchart of G.S.M. condition registration.

FIG. 28 is a flowchart of the processing for registering G.S.M. conditions.

When there is a table setting input from the maintenance console 16, the call controller 11b determines whether the command has been entered correctly (step 601) and ignores the entered data if the command has been entered incorrectly. If the command has been entered correctly, the call controller 11b determines whether the command is for registration of a group to be monitored and an individual to be monitored belonging to this group (step 602). If the answer is "YES", then the call controller 11b registers the correspondence table 1313 indicating the correspondence between G.S.M. monitored groups and monitored individuals in the memory device 11c (steps 602, 603).

If the command is for registration of conditions for changing the monitored individual, then the call controller 11b registers the registration table 1314 that registers conditions for changing. the monitored individual in the memory device 11c (steps 604, 605).

If the command is for registration of monitoring levels of the monitoring individual and monitored individual, the call controller 11b registers the G.S.M. monitoring level registration table 1315 in the memory device 11c (steps 606, 607).

If the command is for registration of monitoring level of a monitored group, the call controller 11b registers the G.S.M. group monitoring level registration table 1316 in the memory device 11c (steps 608, 609).

If the command is for registration of a monitoring target group allocated to a monitoring individual, the call controller 11b registers the correspondence table 1317 giving the correspondence between G.S.M. monitoring individuals and monitored groups in the memory device 11c (steps 610, 611). If the command is for registration of conditions for changing a monitored group, the call controller 11b registers the registration table 1318 that registers conditions for changing a G.S.M. monitored group in the memory device 11c (steps 612, 613).

(c-11) Overall G.S.M. control

Figure 29:
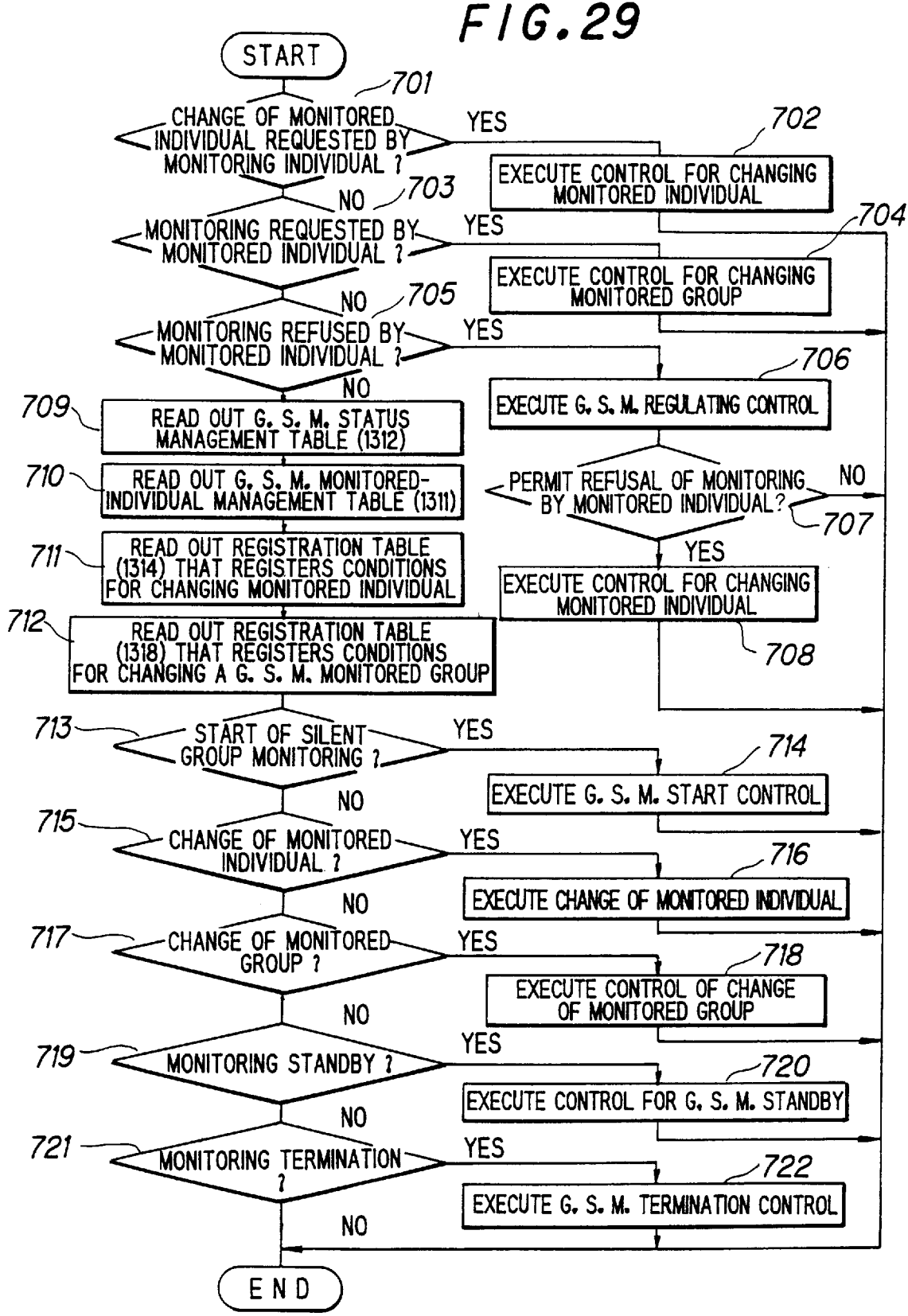
FIG. 29 is a flowchart of G.S.M. control.

FIG. 29 is a flowchart of overall processing for G.S.M. control by the call controller 11b.

The call controller 11b checks to see whether the monitoring individual has requested a change of monitored individual and, if such a request has been made, executes control for changing the monitored individual (steps 701, 702). If the request has not been made, then the call controller 11b determines whether a monitoring request has been made by a monitored individual and, if such a request has been made, executes control for changing the monitored group (steps 703, 704).

If monitoring has not been requested by a monitored individual, the call controller 11b determines whether a monitoring refusal request has been made by the monitored individual (step 705). If the answer is "YES", the call controller 11b executes G.S.M. regulating control (step 706). If a monitoring refusal request has been issued by a monitored individual having the right to refuse monitoring, the call controller 11b halts monitoring of this individual and executes control for changing the individual to be monitored (steps 707, 708). If a monitored individual not having the right to refuse monitoring requests monitoring refusal, the call controller 11b continues the monitoring of this monitored individual.

If a request to refuse monitoring has not been issued by a monitored individual, the call controller 11b successively reads out the G.S.M. status management table 1312, the monitored individual management table 1311, the registration table 1314 that registers conditions for changing the monitored individual and the registration table 1318 that registers conditions for changing a G.S.M. monitored group (steps 709~712). Next, the call controller 11b determines whether start of silent group monitoring has been requested. If the answer is "YES", then the call controller 11b executes G.S.M. start control (steps 713, 714).

If start of silent group monitoring has not been requested, the call controller 11b determines whether it is necessary to change the individual to be monitored. If the answer is "YES", the call controller 11b executes control for changing the monitored individual (steps 715, 716). If it is unnecessary to change the monitored individual, the call controller 11b determines whether it is necessary to change the group to be monitored. If the answer is "YES", the call controller 11b executes control for changing the monitored group (steps 717, 718).

If changing the monitored group is unnecessary, the call controller 11b determines whether it is necessary to execute monitoring standby processing (step 719). If the answer is "YES", the call controller 11b executes G.S.M. standby control (step 720). If standby processing is unnecessary, the call controller 11b determines whether it is necessary to execute monitoring termination processing. If the answer is "YES", G.S.M. termination control is executed (step 722). The program then returns to the beginning and processing is repeated.

(B) Second Embodiment (a) Overview

The first embodiment deals with a case in which one electronic exchange accommodates the terminals of monitoring individuals and monitored individuals. However, an arrangement can be adopted in which a first ISDN exchange accommodates the terminals of individuals to be monitored, a second ISDN exchange accommodates the terminals of monitoring individuals, the first and second ISDN exchanges are connected by an ISDN trunk line and call set-up messages, answer messages, etc. are exchanged by the first and second exchanges to perform control for silent monitoring of groups (G.S.M. control) in a manner similar to that of the first embodiment.

(b) Configuration

Figure 30:
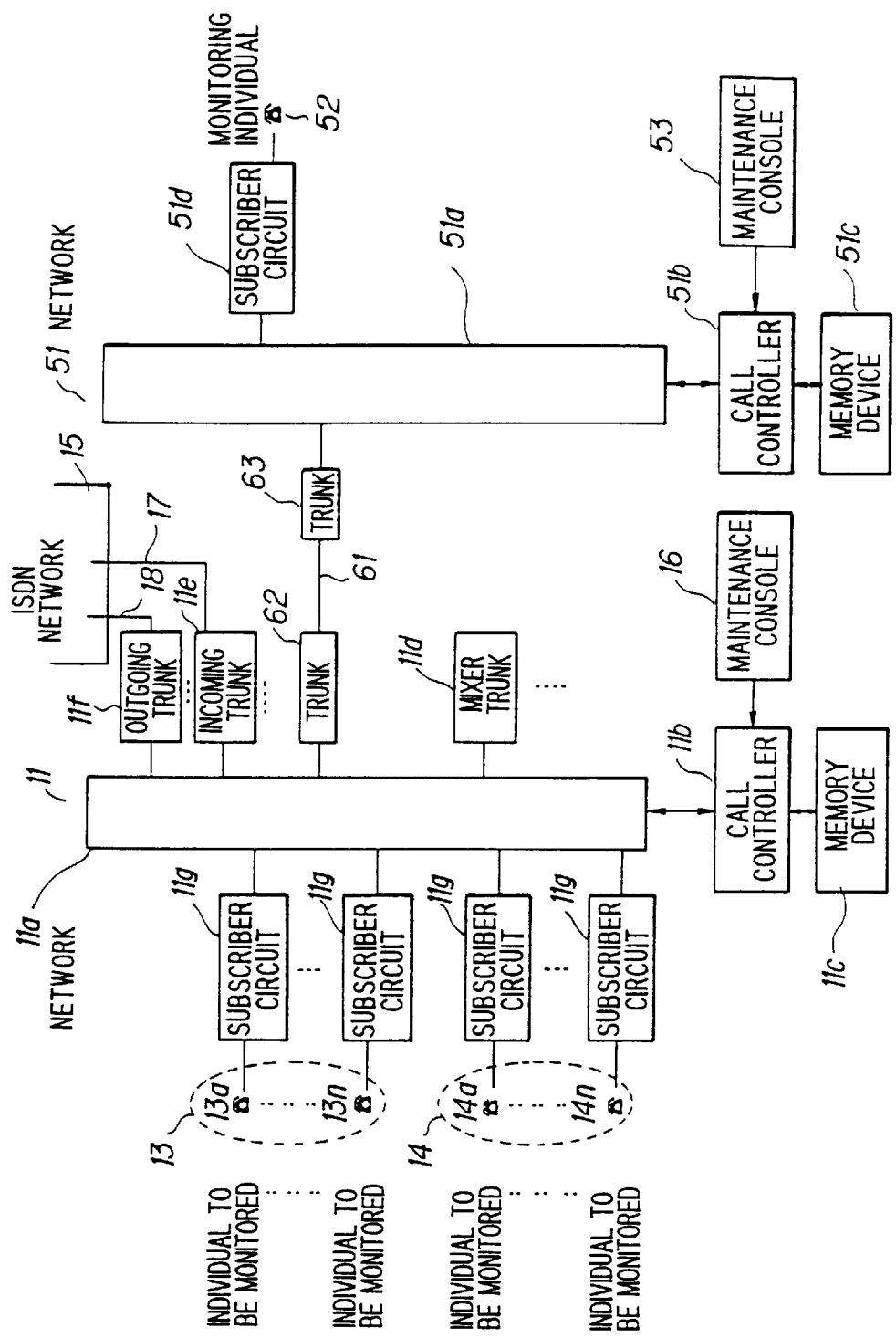
FIG. 30 is a block diagram illustrating another system configuration of the present invention.

FIG. 30 is a block diagram illustrating the system configuration of a second embodiment of the present invention, in which components identical with those of the first embodiment in FIG. 2 are designated by like reference characters. The second embodiment differs from the first embodiment in that (1) separate electronic exchanges (ISDN exchanges) accommodate the monitoring and monitored individuals, and (2) the first and second ISDN exchanges are connected by an ISDN trunk line, call set-up messages and answer messages are exchanged by the first and second exchanges and a monitoring individual is capable of monitoring a monitored individual from a remote location.

In FIG. 30, numeral 11 denotes a first ISDN exchange accommodating the terminals (telephones) 13a~13n, 14a~14m, ... of individuals to be monitored. The first group 13 is formed by the terminals 13a~13n of the monitored individuals and the second group 14 is formed by the terminals 14a~14m of the monitored individuals. Numeral 15 denotes the public network and 16 the maintenance console. Numeral 51 denotes a terminal (telephone) of a monitoring individual accommodated by an ISDN exchange 51, 53 a maintenance console, 61 an ISDN trunk line connecting the first and second ISDN exchanges 11, 51, and 62, 63 trunks. The ISDN exchanges 11, 51 are provided at located remote from each other, send and receive information, which is necessary for silent group monitoring, via the ISDN trunk line 61 by call set-up messages and answer messages, and enable the monitoring individual to monitor a monitored individual at a remote location.

The electronic exchange 11 includes the switch (network circuit) 11a, the call controller 11b for executing control of silent group monitoring, the memory device 11c storing various tables, the mixer trunk 11d, which mixes and outputs audio from a monitored individual, a customer and a monitoring individual, an incoming trunk 11e accommodating an incoming communication line 17 from a public network, an outgoing trunk 11f accommodating an outgoing communication line 18 to the public network, and subscriber circuits 11g. The memory device 11c stores all of the tables 1311~1318 mentioned in the first embodiment. Though only one mixer trunk, one incoming trunk and one outgoing trunk are illustrated, in actuality a number of each of these trunks are provided.

The electronic exchange 51 includes a switch (network circuit) 55a, a call controller 55b, a memory device 51c and a subscriber circuit 51d. The G.S.M. monitoring level registration table 1315 indicating the monitoring level of the monitoring individual is entered from the maintenance console 51 and stored in the memory device 51.

(c) ISDN call set-up control

FIG. 31 is a flowchart of ISDN call set-up control. If a monitoring request has been issued by the monitoring individual 52, the second ISDN exchange 51 reads out the G.S.M. monitoring level registration table 1315 that has been stored in the memory device 51c, obtains the monitoring level of the monitoring individual (steps 801, 802), creates an ISDN call set-up request message that includes the telephone number of the monitoring individual and the monitoring level of the monitored individual (step 803) and sends the ISDN message to the first ISDN exchange 11 via the ISDN trunk line 61 (step 804).

Upon receiving the call set-up request message, the first ISDN exchange 11 extracts the monitoring level of the monitoring individual from this call set-up request message, sets this monitoring level in the G.S.M. monitoring level registration table 1315 of the memory device 11c (steps 801, 805) and then executes G.S.M. start control (step 806).

Figure 32A:
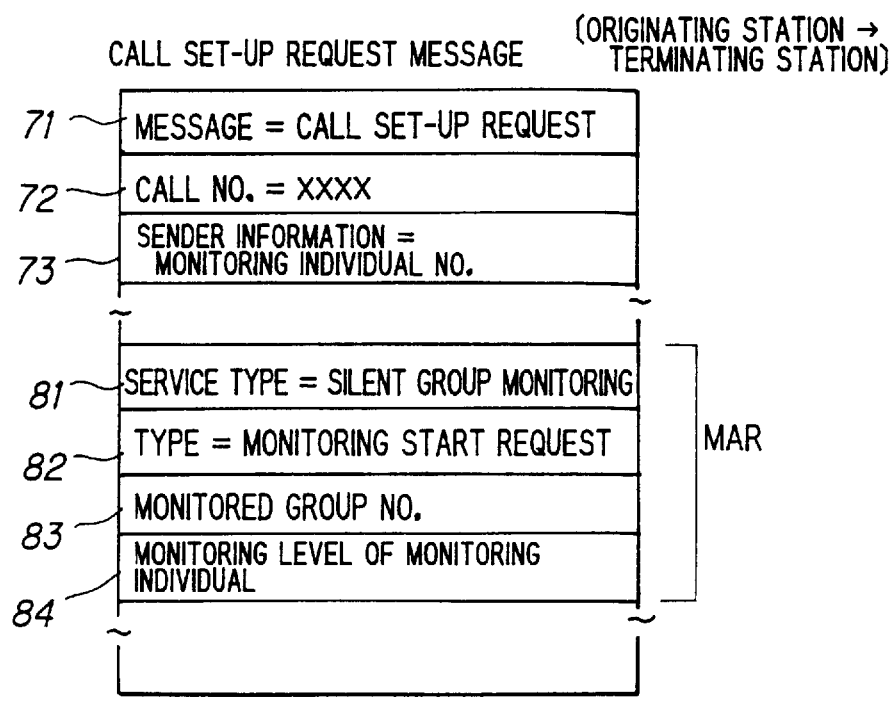
FIGS. 32A, 32B are ISDN layer-3 messages.
Figure 32B:
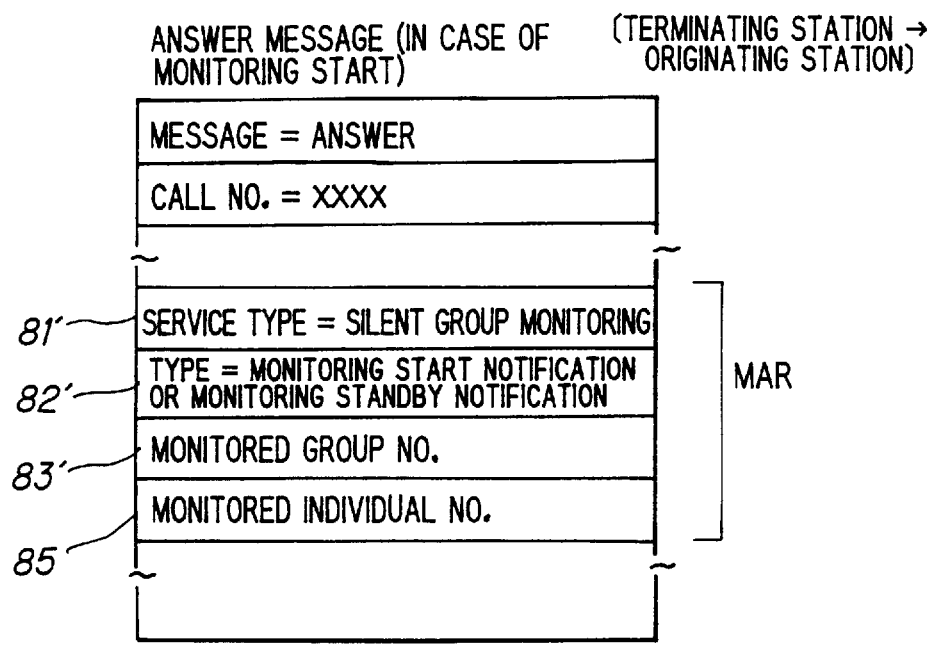

FIGS. 32A, 32B are diagrams for describing the principal portions of ISDN layer-3 messages. FIG. 32A shows a call set-up message when monitoring requested, and FIG. 32B shows an answer message in response to the monitoring request. When monitoring is requested or when a request is answered, a G.S.M. information area MAR is added to codeset 7 information in the ISDN message.

The call set-up request message at the time of a monitoring request includes the message type (a call set-up request) 71, a call number 71, a telephone number 73 of the monitoring individual, etc., as well as the G.S.M. information area MAR. The G.S.M. information area MAR includes (1) service type=group silent monitoring 81, (2) type=monitoring start request 82, (3) number 83 of group monitored, and (4) monitoring level 84 of monitoring individual.

The answer message in response to the monitoring request also is equipped with a G.S.M. information area MAR. The G.S.M. information area MAR includes (1) service type=silent group monitoring 81', (3) type=notification of monitoring start or notification of monitoring standby 82', (3) monitored group number 83', and (4) number 85 of monitored individual.

(d) ISDN layer-3 message sequence monitoring start/standby

FIG. 33 is a diagram for describing the sequence of ISDN layer-3 messages in a case where silent group monitoring is performed via an ISDN trunk line.

When the monitoring individual 52 issues a monitoring request, the exchange 51 accommodating the monitoring individual creates a call set-up request message (FIG. 32A) and sends the message to the first exchange 11 via the ISDN trunk line 61. If the call set-up request message is received, the first exchange 11 sends a call set-up reception message to the second exchange 51 and then executes control for the purpose of starting monitoring (see FIGS. 14~16).

If monitoring of a prescribed individual to be monitored is possible, the second exchange 51 is so notified of start of monitoring by the answer message (see FIG. 32B). However, if a talking individual to be monitored does not exist in the specified group to be monitored and monitoring cannot be carried out, the second exchange 51 is notified of monitoring standby by the answer message. Upon receiving the answer message, the second exchange 51 sends an answer confirmation message to the first exchange 11 and then notifies the monitoring individual 52 of start of monitoring or monitoring standby.

In case of start of monitoring, the first exchange 11 subsequently establishes a channel and sends mixed audio from the monitored individual and customer to the terminal 52 of the monitoring individual via the ISDN trunk line 61.

(e) ISDN layer-3 message sequence (monitoring impossible)

FIG. 34 is a diagram for describing a sequence of ISDN layer-3 messages in a case where silent group monitoring is performed via an ISDN trunk line.

If the monitoring individual 52 issues a monitoring request, the exchange 51 accommodating the monitoring individual creates a call set-up request message (FIG. 32A) and sends the message to the first exchange 11 via the ISDN trunk line 61. If the call set-up request message is received, the first exchange 11 sends a call set-up reception message to the second exchange 51 and then executes control for the purpose of starting monitoring (see FIGS. 14~16).

If the result of monitoring start control is that the monitored group specified by the monitoring individual cannot be monitored, the exchange 11 sends a disconnect message to the second exchange 52. In response to reception of the disconnect message, the second exchange 52 notifies the monitoring individual 52 of the fact that monitoring is impossible and then exchanges a release message and a release confirmation message with the exchange 11.

(f) ISDN layer-3 message sequence (change of monitored individual)

Figure 35:
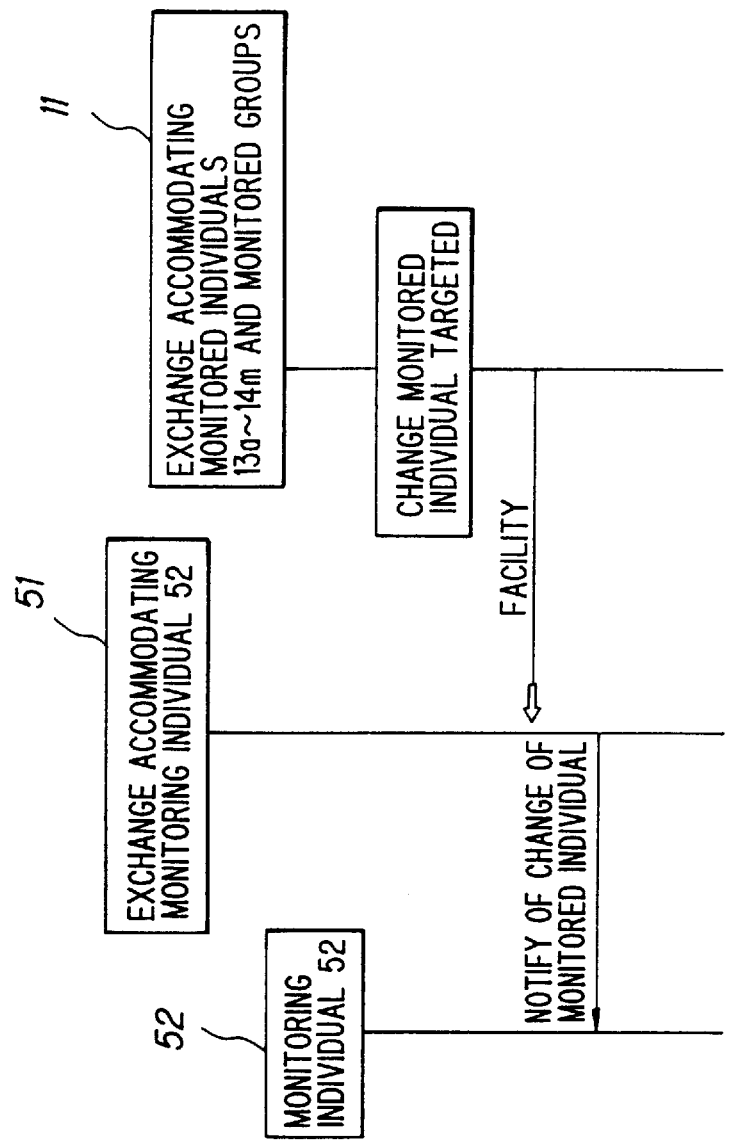
FIG. 35 is a sequence (change of monitored individual) of ISDN layer-3 messages in a case where silent group monitoring is performed via an ISDN trunk line.

When silent group monitoring starts and an individual to be monitored is changed, it is required that the monitoring individual be so notified. FIG. 35 is a diagram for describing a sequence of ISDN layer-3 messages in a case where notification of a change of monitored individual is given during monitoring.

When an individual to be monitored is changed, the first exchange 11 creates a facility message for changing monitored individual and sends the message to the second exchange 52. In response to reception of the facility message, the second exchange notifies the monitoring individual 52 of a change in monitored individual.

Figure 36A:
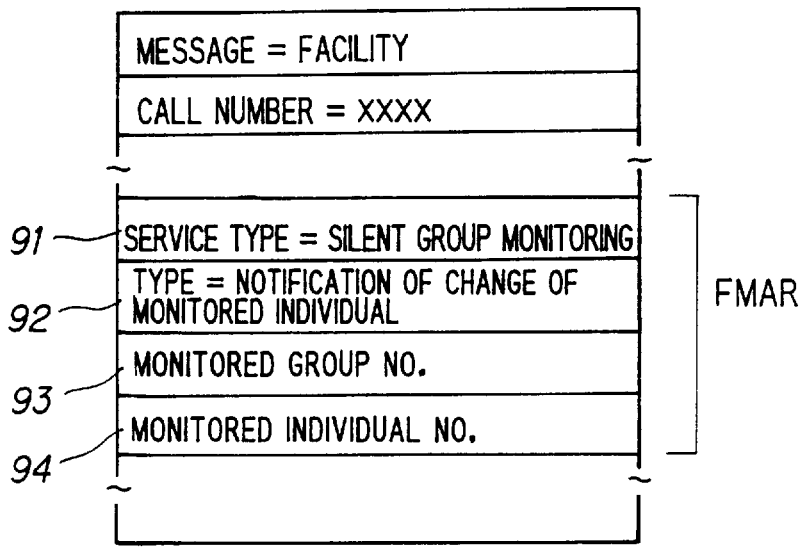
FIGS. 36A, 36B are ISDN layer-3 facility messages.
Figure 36B:
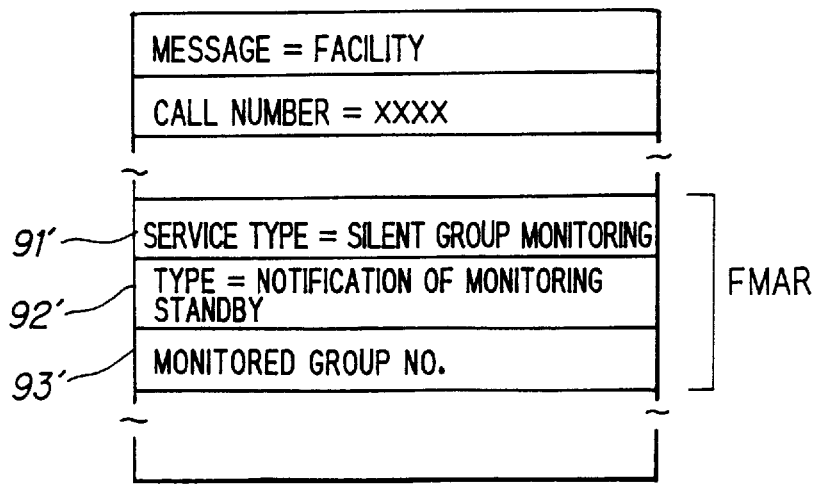
Figure 40:
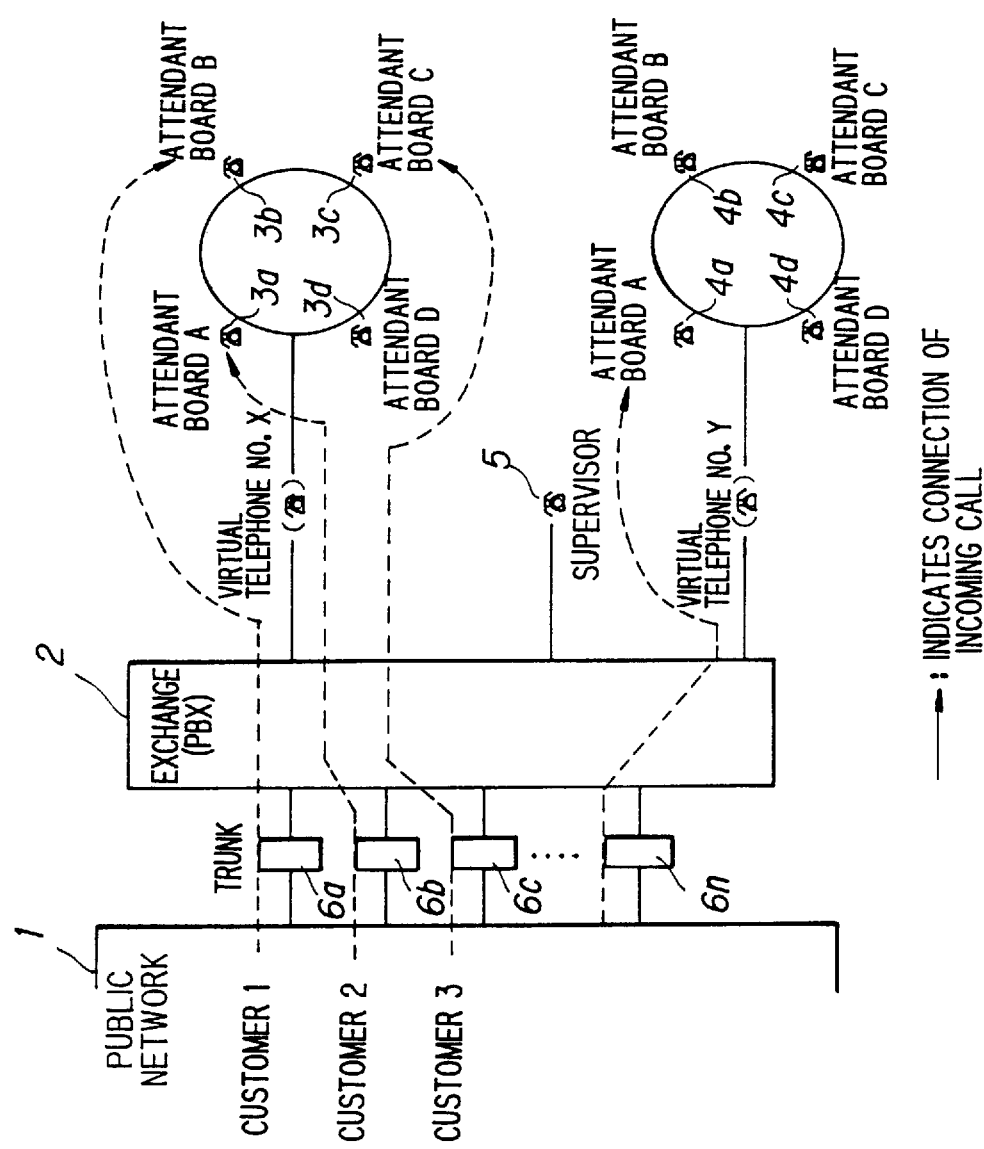
FIG. 40 is a diagram for describing silent monitoring according to the,prior art.

FIGS. 36A, 36B are diagrams for describing facility messages. A facility message is a message sent and received when a communication line has been established. A G.S.M. information area FMAR is added to codeset 7 information in an ordinary ISDN facility message. As shown in FIG. 36A, the G.S.M. information area FMAR includes (1) service type=group silent monitoring 91, (2) type=monitored-individual change notification 92, (3) group number 93 of monitored individual, and (4) number 94 of monitored individual.

(g) ISDN layer-3 message sequence (monitoring standby)

If a talking individual to be monitored does not exist when silent group monitoring starts and an individual to be monitored is changed, it is required that the monitoring individual be so notified. FIG. 37 is a diagram for describing a sequence of ISDN layer-3 messages in a case where notification of monitoring standby is given during monitoring.

When monitoring standby comes into effect, the first exchange 11 creates a facility message for monitoring standby and sends the message to the second exchange 52. In response to reception of the facility message, the second exchange 51 notifies the monitoring individual 52 of monitoring standby. FIG. 36B is a diagram for describing of a facility message for notifying of monitoring standby. The G.S.M. information area FMAR includes (1) service type= group silent monitoring 91', (2) type=monitoring standby notification 92', and (3) group number 93' of monitored individual.

(h) ISDN layer-3 message sequence (standby→monitoring start

If a prescribed individual to be monitored begins talking and monitoring starts during monitoring standby, it is required that the monitoring individual be so notified. FIG. 38 is a diagram for describing a sequence of ISDN layer-3 messages in a case where monitoring notification is given of the fact that monitoring has started during monitoring standby.

If monitoring starts during monitoring standby, the first exchange 11 creates a facility message for monitoring start and sends the message to the second exchange 52. In response to reception of the facility message, the second exchange 51 notifies the monitoring individual 52 of start of monitoring.

(i) ISDN layer-3 message sequence (monitoring termination)

FIG. 39 is a diagram for describing a sequence of ISDN layer-3 messages at the time of monitoring standby.

If the monitoring individual 52 performs an operation to terminate monitoring, the second exchange 51 sends a disconnect message to the first exchange 11, which executes monitoring termination processing in response to reception of the disconnect message. The first and second exchanges thenceforth send and receive a release message and a release confirmation message and the line is disconnected.

[Effects of the Invention]

In accordance with the present invention, individuals to be monitored are formed into groups, monitoring target groups are allocated to a monitoring individual, call-in-progress/call-not-in-progress status of monitored individuals is observed group by group, and the monitoring individual is allowed to automatically monitor, in successive fashion, calls between customers and call-in-progress monitored individuals belonging to the monitoring target groups. As a result, a plurality of individuals to be monitored belonging to a set monitored group can be monitored in succession in response to a single monitoring request operation performed by a monitoring individual and without requiring that the monitoring individual perform an operation requesting that the monitored individual be changed. This makes it possible for the monitoring individual to work more efficiently. Accordingly, the time needed for monitoring to start and the time needed to change an individual to be monitored can be shortened, thereby making it possible to improve the quality with which telephones are answered in telemarketing or to provide better service in silent monitoring.

In accordance with the present invention, status of monitoring, such as start/end of monitoring, change of monitored individual and change of monitoring target group, is observed, the monitoring individual is notified of the status of monitoring and the individual who is undergoing monitoring is notified of the fact. As a result, the monitoring individual can readily ascertain the status of monitoring and the monitored individual can verify the fact that he or she is being monitored.

In accordance with the invention, it is determined whether a call-in-progress individual to be monitored exists in a monitoring target group at start of monitoring or when a monitored individual is changed. In a case where a call-in-progress individual to be monitored does not exist in the monitoring target group, the monitoring individual is asked whether monitoring is to be ended or whether the monitoring individual will wait for monitoring to become possible. As a result, monitoring termination processing or monitoring standby processing can be executed, depending upon the command entered by the monitoring individual in response to the inquiry, In accordance with the invention, conditions for changing a targeted individual to be monitored are set and the targeted individual to be monitored is changed automatically in accordance with these conditions. As a result, a monitored individual can be changed automatically in a manner intended by the monitoring individual by changing the conditions.

In accordance with the invention, whether the monitoring individual has issued a request to change the individual to be monitored is observed after the start of monitoring. If this request has been issued, the monitoring individual is allowed to monitor the call between a customer and the next call-in-progress individual to be monitored that belongs to the monitoring target group. As a result, an individual to be monitored can be changed in conformity with a request from the monitoring individual.

In accordance with the present invention, monitoring levels for the individuals to be monitored and for the monitoring individual are set. If the monitoring level of the monitoring individual is lower than the monitoring level of an individual to be monitored, it is so arranged that this individual is not monitored. As a result, a skilled monitored individual can be excluded from individuals to be monitored, thus making it possible to perform the silent group monitoring operation more efficiently.

In accordance with the present invention, a predetermined monitored individual is given the right to refuse monitoring. If an individual undergoing monitoring requests refusal of monitoring, it is determined whether this individual has been given the right to refuse monitoring. If this right has been given, then monitoring of this monitored individual is halted and the individual to be monitored is changed. By giving an experienced monitored individual the right to refuse monitoring, the silent group monitoring operation can be performed more efficiently.

In accordance with the present invention, monitoring levels for each group and for the monitoring individual are set. If the monitoring level of the monitoring individual is lower than the monitoring level of a monitoring target group, it is so arranged that monitoring of an individual belonging to this monitoring target group will not be performed by the monitoring individual. As a result, a group composed of skilled monitored individuals can be excluded from monitoring, thus making it possible to perform the silent group monitoring operation more efficiently.

In accordance with the invention, a plurality of monitoring target groups are allocated to a monitoring individual. (1) If, when a monitoring request is issued by the monitoring individual, a monitoring target group has not been specified, monitoring of a call-in-progress individual to be monitored belonging to a first-ranked monitoring target group among the allocated monitoring target groups is started. (2) If, when a monitoring request is issued by the monitoring individual, a monitoring target group has not been specified, monitoring of a call-in-progress individual belonging to this monitoring target group is started. As a result, individuals to be monitored can be monitored over a plurality of monitored groups starting from a predetermined monitored group.

In accordance with the invention, conditions for changing a monitoring target group are set and a monitoring target group is changed automatically in accordance with these conditions. As a result, conditions for changing a group can be altered in dependence upon the monitoring individual and a monitored group can be changed automatically in a manner intended by the monitoring individual.

In accordance with the present invention, whether the monitoring individual has issued a request to change a monitoring target group is observed. If this request has been issued, the monitoring individual is allowed to monitor the call between a customer and the call-in-progress individual to be monitored that belongs to the next monitoring target group. As a result, the monitoring target group can be changed in response also to a request from the monitoring individual.

If a monitoring request has been issued by a monitored individual, the present invention is such that the monitoring individual for whom the monitoring target group to which this monitored individual belongs is the monitoring target group is found. Monitoring of this monitored individual is started by this monitoring individual. As a result, if there is a request for assistance from a monitored individual, the monitoring individual is capable of promptly interrupting the conversation between this monitored individual and the customer and can assist this monitored individual. This makes it possible to improve the service provided to the customer.

In accordance with another aspect of the present invention, there are provided a first ISDN exchange that accommodates the terminals of individuals to be monitored, a second ISDN exchange that accommodates the terminals of monitoring individuals, and an ISDN delay line connecting the first and second ISDN exchanges. The first ISDN forms the monitored individuals into groups, allocates monitoring target groups to the monitoring individuals and oversees call-in-progress/call-not-in-progress states of the monitored individuals group by group. When a monitoring request has been issued by a monitoring individual, the second ISDN exchange sends the first ISDN exchange a call set-up request message, which includes the identification number of the monitoring individual and monitoring start request. Upon receiving the call set-up request message, the first ISDN exchange sends a call mixing signal, which is obtained from a customer and a call-in-progress monitored individual belonging to the monitoring target group of the monitoring individual, to the terminal of the monitoring individual via the ISDN trunk line and second ISDN exchange and allows the monitoring individual to perform silent group monitoring from a remote location.

As many apparently widely different embodiments of the present invention can be made without departing from the spirit and scope thereof, it is to be understood that the invention is not limited to the specific embodiments thereof except as defined in the appended claims.

What is claimed is:

1. A method of controlling silent monitoring of a group in an electronic exchange accommodating a terminal of a monitoring individual and terminals of individuals to be monitored and having a silent monitoring function which allows the monitoring individual to monitor a call between a prescribed individual to be monitored and a customer, the method comprising the steps of:

forming the individuals to be monitored into groups;

allocating monitoring target groups to the monitoring individual;

observing, group by group, call-in-progress/call-not-in-progress status of individuals to be monitored belonging to the monitoring target group; and allowing the monitoring individual to automatically monitor, in succession, calls between customers and call-in-progress individuals to be monitored belonging to the monitoring target groups allocated to said monitoring individual.

2. The method according to claim 1, further comprising the steps of:

observing status of monitoring; and notifying the monitoring individual of said status of monitoring and notifying an individual who is currently being monitored of the fact that monitoring is in progress.

3. The method according to claim 1, further comprising the steps of:

determining one of whether a call-in-progress individual to be monitored exists in a monitoring target group at start of monitoring and when a monitored individual is changed;

if the call-in-progress individual to be monitored does not exist in the monitoring target group, inquiring of the monitoring individual whether monitoring is to be ended or whether the monitoring individual will wait until monitoring becomes possible; and executing one of monitoring termination processing and monitoring standby processing, depending upon a command from the monitoring individual.

4. The method according to claim 1, further comprising the steps of:

setting conditions for changing an individual to be monitored; and allowing the monitoring individual to automatically change the individual to be monitored in accordance with these conditions.

5. The method according to claim 1, further comprising the steps of:

observing, after start of monitoring, whether the monitoring individual has requested that an individual to be monitored be changed; and if the monitoring individual has requested that an individual to be monitored be changed, allowing the monitoring individual to monitor the call between a customer and the next call-in-progress individual to be monitored belonging to the monitoring target group.

6. The method according to claim 1, further comprising the steps of:

setting monitoring levels for respective ones of individuals to be monitored and the monitoring individual; and performing control in such a manner that if the monitoring level of the monitoring individual is lower than the monitoring level of an individual to be monitored, then this individual is not monitored by the monitoring individual.

7. The method according to claim 1, further comprising the steps of:

giving a predetermined individual to be monitored the right to refuse monitoring;

observing whether a monitored individual currently being monitored has requested refusal of monitoring;

if this monitored individual has requested refusal of monitoring, determining whether this monitored individual has been given the right to refuse monitoring;

if this monitored individual has been given the right to refuse monitoring, halting monitoring of this monitored individual and starting monitoring of the next individual to be monitored; and if said monitored individual has not been given the right to refuse monitoring, continuing monitoring of this monitored individual.

8. The method according to claim 1, further comprising the steps of:

setting monitoring levels for respective ones of the groups and the monitoring individual; and performing control in such a manner that if the monitoring level of the monitoring individual is lower than the monitoring level of a monitoring target group, then monitoring of an individual belonging to this monitoring target group will not be performed by the monitoring individual.

9. The method according to claim 1, further comprising a step of terminating monitoring of a monitoring target group if the monitoring individual has issued a monitoring termination request.

10. The method according to claim 1, further comprising the steps of:

allocating a plurality of monitoring target groups to a monitoring individual;

if, when a monitoring request is issued by the monitoring individual, a monitoring target group has not been specified by the monitoring individual, starting monitoring of a call-in-progress individual to be monitored belonging to a first-ranked monitoring target group among the allocated monitoring target groups; and if, when a monitoring request is issued by the monitoring individual, a monitoring target group has been specified by the monitoring individual, starting monitoring of a call-in-progress individual to be monitored belonging to the specified monitoring target group.

11. The method according to claim 10, further comprising the steps of:

setting conditions for changing a monitoring target group; and allowing the monitoring individual to automatically change a monitoring target group in accordance with these conditions.

12. The method according to claim 10, further comprising the steps of:

observing whether the monitoring individual has issued a request to change a monitoring target group; and if the monitoring individual has issued the request to change a monitoring target group, allowing the monitoring individual to monitor the call between a customer and a call-in-progress individual to be monitored belonging to the next monitoring target group.

13. The method according to claim 10, further comprising the steps of:

observing whether an individual to be monitored has issued a monitoring request;

if the individual to be monitored has issued a monitoring request, obtaining a monitoring individual for whom the group to which this monitored individual belongs is made the monitoring target group; and allowing the obtained monitoring individual to start monitoring of this monitored individual.

14. A system for silent monitoring of a group, said system having a silent monitoring function which allows a monitoring individual to monitor a call between an individual to be monitored and a customer, said system comprising:

a first ISDN exchange accommodating terminal of monitored individuals;

a second ISDN exchange accommodating a terminal of monitoring individual; and an ISDN trunk line connecting said first and second ISDN exchanges;

wherein said first ISDN exchange forms the monitored individuals into groups, allocates monitoring target groups to the monitoring individual and observes call-in-progress/call-not-in-progress status of the monitored individuals group by group;

when a monitoring request has been issued by the monitoring individual, said second ISDN exchange sends said first ISDN exchange a call set-up request message, which includes the identification number of the monitoring individual and a monitoring start request; and said first ISDN exchange receives the call set-up request message and sends a call signal, which is obtained from a customer and a call-in-progress monitored individual belonging to the monitoring target group allocated to the monitoring individual, to the terminal of the monitoring individual via said ISDN trunk line and said second ISDN exchange.

15. The system according to claim 14, wherein said first ISDN exchange observes status of monitoring, and sends said status of monitoring to the terminal of the monitoring individual via said ISDN trunk line and said second ISDN exchange.

16. The method as in claim 1, wherein status is observed of at least one of start/end of monitoring, change of monitored individual, and change of monitoring target group.

17. The system according to claim 15, wherein status is observed of at least one of start/end of monitoring, change of monitored individual, and change of monitoring target group.

* * * * *